(12) United States Patent
Handa

(10) Patent No.: US 10,465,849 B2
(45) Date of Patent: Nov. 5, 2019

(54) GAS FILLING METHOD

(71) Applicant: HONDA MOTOR CO., LTD., Tokyo (JP)

(72) Inventor: Kiyoshi Handa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 317 days.

(21) Appl. No.: 15/259,547

(22) Filed: Sep. 8, 2016

(65) Prior Publication Data
US 2017/0074456 A1 Mar. 16, 2017

(30) Foreign Application Priority Data

Sep. 10, 2015 (JP) ................... 2015-178741

(51) Int. Cl.
*F17C 5/00* (2006.01)
*F17C 1/00* (2006.01)
(Continued)

(52) U.S. Cl.
CPC .............. *F17C 5/007* (2013.01); *F17C 1/005* (2013.01); *F17C 5/06* (2013.01); *F17C 13/084* (2013.01);
(Continued)

(58) Field of Classification Search
CPC ...... F17C 5/06; F17C 5/007; F17C 2221/012; F17C 2250/032; F17C 2250/043;
(Continued)

(56) References Cited

U.S. PATENT DOCUMENTS

2009/0110990 A1* 4/2009 Izutani .................. C01B 3/00 429/410
2010/0307636 A1* 12/2010 Uemura ................ F17C 5/06 141/4

(Continued)

FOREIGN PATENT DOCUMENTS

JP 10-103595 A 4/1998
JP 2006107972 A * 4/2006 ........ H01M 8/04089

OTHER PUBLICATIONS

English abstract of JP2006-107972 (Year: 2006).*
S. Maruyama, "Tank Volume Estimation of FCV for Hydrogen Filling," The 19th Fuel Cell Symposium proceedings, pp. 286-289.

*Primary Examiner* — Andrew D Stclair
(74) *Attorney, Agent, or Firm* — Squire Patton Boggs (US) LLP

(57) ABSTRACT

A hydrogen gas filling method includes: a step for acquiring a pre-supply upstream pressure that is a pressure in a station side of a piping at time t0, a step for starting the supply of hydrogen gas from the station at time t1 that is after the pre-supply upstream pressure is acquired, a step for acquiring a post-supply upstream pressure at time t2 that is immediate after the supply of hydrogen gas starts, a step for acquiring a start-time flowrate that is a flowrate of hydrogen gas at the same period as the step for starting, a step for estimating the pressure loss generated in the piping at the time of the supply by using the pre-supply upstream pressure, post-supply upstream pressure, and the start-time flowrate, and a step for stopping the supply of hydrogen gas so that a tank pressure conforms with a predetermined target pressure.

7 Claims, 15 Drawing Sheets

(51) Int. Cl.
*F17C 5/06* (2006.01)
*F17C 13/08* (2006.01)

(52) U.S. Cl.
CPC .................. *F17C 2201/056* (2013.01); *F17C 2205/0329* (2013.01); *F17C 2205/0335* (2013.01); *F17C 2205/0394* (2013.01); *F17C 2221/012* (2013.01); *F17C 2223/0123* (2013.01); *F17C 2223/035* (2013.01); *F17C 2225/0123* (2013.01); *F17C 2225/035* (2013.01); *F17C 2227/047* (2013.01); *F17C 2250/032* (2013.01); *F17C 2250/043* (2013.01); *F17C 2250/0434* (2013.01); *F17C 2250/0439* (2013.01); *F17C 2250/0443* (2013.01); *F17C 2250/075* (2013.01); *F17C 2260/023* (2013.01); *F17C 2260/025* (2013.01); *F17C 2265/065* (2013.01); *F17C 2270/0184* (2013.01); *F17C 2270/0763* (2013.01); *Y02E 60/321* (2013.01)

(58) Field of Classification Search
CPC ........ F17C 2250/0434; F17C 2260/038; F17C 1/005; F17C 13/084; Y02E 60/321
See application file for complete search history.

(56) References Cited

U.S. PATENT DOCUMENTS

2011/0259469 A1* 10/2011 Harty ...................... F17C 5/007
141/4
2012/0000574 A1* 1/2012 Nishiumi .................. F17C 5/06
141/94

* cited by examiner

GAS FILLING METHOD

This application is based on and claims the benefit of priority from Japanese Patent Application No. 2015-178741, filed on 10 Sep. 2015, the content of which is incorporated herein by reference.

BACKGROUND OF THE INVENTION

Field of the Invention

The present invention relates to a gas filling method for filling gas in a tank.

Related Art

Fuel cell vehicles travel by supplying oxygenated air and hydrogen gas that is fuel gas to the fuel cell, and driving an electric motor using the electric power thereby generated. In recent years, progress has been made in the practical implementation of fuel cell vehicles employing such fuel cells as the energy source for generating motive power. Although hydrogen gas is required to generate electric power by fuel cells, with the fuel cell vehicles of recent years, vehicles have become mainstream that store a sufficient amount of hydrogen gas in advance in a high-pressure tank or a hydrogen tank equipped with a storage alloy, and use the hydrogen gas inside of the tank to travel. In concert with this, vigorous research has progressed also in the filling technology for quickly filling as much hydrogen gas as possible into the tank.

When hydrogen gas is filled in the tank, the pressure and temperature in the tank rise, and the rising state in the time has strong correlation mainly with a type, specifically, with a volume of the tank. Herein, a case where gas is filled in a general method, more specifically, a case where gas is filled while the pressure rise rate is maintained constant in a hydrogen station including a pre-cooling system that cools gas to be filled, is considered. In this case, the temperature rises gently during filling in a hydrogen tank having relatively large volume, while the temperature rises sharply during filling in a hydrogen tank having relatively small volume since such tank is easy to be influenced by a heat mass of a piping during filling. Therefore, in order to quickly fill hydrogen gas in a tank of a vehicle, a technique for acquiring a volume of a tank equipped in the vehicle as accurate as possible and rapidly, in a hydrogen gas supply side, i.e. a station side.

Non-Patent Document 1 illustrates a method for filling a small amount of hydrogen gas experimentally in a tank of which volume is unknown, and estimating the volume of the tank from variation of the state in the tank in the time. More specifically, the technology of Non-Patent Document 1 illustrates a method for estimating a volume of a tank by using the pressure rise width in the tank before and after a predetermined amount of hydrogen gas is filled. In this method, pressure is needed to be acquired before and after hydrogen gas is filled experimentally. Moreover, the fuel cell vehicles of recent years are equipped with sensors that detect the temperature and/or pressure in the tank. Therefore, when the estimation method of Non-Patent Document 1 is applied to the station to estimate the volume of the tank of the vehicle in the station side, the station utilizes communication with the vehicle to acquire the pressure rise width in the tank.

FIG. 15 is a view showing the magnitude and breakdown of the error of various types of sensors affecting on the volume estimation result, when the volume of the tank is estimated by known method by using the pressure rise width in the tank. In FIG. 15, the horizontal axis represents the pressure rise width in the tank (i.e. corresponding to the amount of experimentally filled hydrogen gas) and the vertical axis represents the absolute value of the error.

First, when the volume of the tank is estimated by the pressure rise width in the tank, as the above described method of Non-Patent Document 1, various sensors such as a mass flow meter that detects a mass flowrate of hydrogen gas (generally provided in the station), an ambient temperature sensor that detects the temperature of the atmosphere (generally provided in the station), and a pressure sensor arranged in a piping for detecting the pressure inside the tank (generally provided in the station). As illustrated in FIG. 15 with different patterns, the estimation result of the volume of the tank is influenced by the offset error of the mass flow meter, the offset error of the ambient temperature sensor, the offset error of the pressure sensor, and the pressure hysteresis error. Herein, the pressure hysteresis error is the error of the pressure sensor other than the offset error, the error generated by A/D conversion of output signals of the pressure sensor, and the error due to variation of valve opening pressure difference of check valves provided in the piping, or the like, and any of which has the hysteresis property in which a mark of the error cannot be predicted for every measurement time.

As illustrated in FIG. 15, among these four errors, the pressure hysteresis error affects the largest influence on the volume estimation result of the tank. In addition, the pressure hysteresis error is mostly inversely proportional to the pressure variation amount of the tank. This means that as the pressure rise width in the tank becomes larger, the volume in the tank can be estimated accurately. In other words, in order to estimate the volume of the tank accurately, it is preferable that the amount of hydrogen gas experimentally filled is increased as much as possible so that the pressure rise width in the tank is increased as much as possible.

Non-Patent Document 1: Shinichi Maruyama, "Volume estimation of FCV tank", The 19th Fuel Cell Symposium proceedings, pp. 286-289

SUMMARY OF THE INVENTION

However, there is a case that, when hydrogen gas is filled in the tank in the station, a test called as a leak check is periodically performed. This leak check is a test that temporarily stops the filling of hydrogen gas and determines the existence of leaks of hydrogen gas. Furthermore, the timing for performing this leak check is determined according to the pressure rise width. More specifically, the leak check is determined to be performed during a time until the pressure in a predetermined point rises to a predetermined upper limit pressure $\Delta P_{max}$ determined according to a rule (more specifically, for example, 20 MPa) from a predetermined start point (for example, the time of filling initiation or the time of performing the leak check).

Herein, the tank volume estimation method as illustrated in Non-Patent Document 1 is accompanied with the filling of hydrogen gas over a certain period as described above. In addition, the filling needs to be temporarily stopped when the leak check is performed. Accordingly, in order to estimate unknown tank volume by utilizing the above described tank volume estimation method in the station, it is reasonable to utilize the filling of the time from the start of main filling of hydrogen gas from the station until the initial leak check is performed. In other words, it is recognized that, by taking the filling start time as a start point, estimating the tank volume by utilizing variation of the state in the tank of the time from the start point and until the filling of hydrogen gas is temporarily stopped for performing the initial leak check, and performing the filling of hydrogen gas by using the estimated tank volume after the initial leak check, hydrogen gas can be quickly filled also in unknown tank. In addition, by conforming the timing of the initial leak check and the timing of estimating the tank volume in this way, the number of opening and closing a flowrate control valve can be minimized in the station side.

In addition, as explained referencing FIG. 15, in order to estimate the volume accurately, it is preferable that the pressure rise width from the predetermined start point is made as large as possible. Accordingly, when the tank volume is estimated by utilizing the period until the initial leak check, in order to improve the estimation accuracy to the maximum, it is preferable that the filling is temporarily stopped, while the pressure is increased as much as possible within an allowable range, and advancing to the initial leak check is performed.

To realize this, when the pressure in the tank at the time point that is a start point, is defined as "Pi", it is necessary that the supply of hydrogen gas is stopped in the station side so that the pressure in the tank accurately conforms with a target pressure (Pi+ΔPmax) which is the "Pi" added with the upper limit. However, during the supply of hydrogen gas, the pressure loss is generated by the piping that connects the station and the tank. Therefore, since the station cannot directly grasp the pressure in the tank while supplying hydrogen gas, it is difficult to stop the supply of hydrogen gas at an appropriate timing so that the pressure in the tank conforms with the target pressure.

The present invention has been made in view of such problems as described above, has a final goal of improving the estimation accuracy of unknown tank volume, and has an object of providing a gas filling method that can stop the supply of gas at an appropriate timing so that the pressure in the tank conforms with a predetermined target, to realize the final goal.

According to a first aspect of the present invention, a gas filling method for connecting a tank (e.g., hydrogen tanks 31, 32, 33 described later) that stores gas and a supply source of gas (e.g., a pressure accumulator 91 of a hydrogen station 9 described later) by a piping (e.g., a station piping 93, a vehicle piping 35, and the like), and filling gas in the tank, includes: a pre-start upstream pressure acquisition step for acquiring a pre-start upstream pressure that is a pressure in the supply source side of the piping before the start of the supply of gas; a supply start step for starting the supply of gas from the supply source after the pre-start upstream pressure is acquired; a post-start upstream pressure acquisition step for acquiring a post-start upstream pressure that is a pressure in the supply source side of the piping after the start of the supply of gas; a post-start flowrate acquisition step for acquiring a post-start flowrate that is a flowrate of gas in the same period as the acquisition period of the post-start upstream pressure; a pressure loss estimation step for estimating the pressure loss generated in the piping at the time of the supply of gas by using the pre-start upstream pressure, the post-start upstream pressure, and the post-start flowrate; and a supply stop step for stopping the supply of gas so that a tank pressure that is the pressure in the tank conforms with a predetermined target pressure by using the pressure loss.

According to a second aspect of the present invention, in this case, it is preferable for the gas filling method to further include: a tank pressure estimation step for estimating a tank pressure that is a pressure in the tank during the supply of gas by using the pressure loss; and a volume estimation step for estimating a volume of the tank after the supply of the gas is stopped.

According to a third aspect of the present invention, in this case, it is preferable that, in the supply stop step, after the upstream pressure of the supply source side during the supply of gas, reaches the vicinity of the target pressure, the supply of gas is continued until the tank pressure reaches the vicinity of the target pressure, while the upstream pressure is maintained to be the target pressure.

According to a fourth aspect of the present invention, in this case, it is preferable that, in the supply stop step, the supply of gas is stopped when the tank pressure reaches the vicinity of the target pressure.

According to a fifth aspect of the present invention, in this case, it is preferable for the gas filling method to further include: a pre-stop upstream pressure acquisition step for acquiring a pre-stop upstream pressure that is a pressure in the supply source side of the piping before the supply of gas is stopped; a post-stop upstream pressure acquisition step for acquiring a post-stop upstream pressure that is a pressure in the supply source side of the piping after the supply of gas is stopped; a pre-stop flowrate acquisition step for acquiring a pre-stop flowrate that is a flowrate of gas at the same period as the acquisition period of the pre-stop upstream pressure; and a stop-time pressure loss estimation step for estimating the pressure loss generated in the piping at the time of the supply of gas by using the pre-stop upstream pressure, the post-stop upstream pressure, and the pre-stop flowrate.

According to a sixth aspect of the present invention, in this case, it is preferable that, in the post-start upstream pressure acquisition step, the post-start upstream pressure is acquired in two or more different acquisition periods from when the flowrate of gas is 0 until the flowrate of the gas reaches a predetermined target flowrate, in the post-start flowrate acquisition step, the post-start flowrate is acquired in the same period as each of the acquisition periods, and in the pressure loss estimation step, the pressure loss generated in the piping at the time of the supply of gas is estimated by using the pre-start upstream pressure, and the post-start upstream pressure and the post-start flowrate acquired in each of the acquisition periods.

According to a seventh aspect of the present invention, in this case, it is preferable that the gas filling method further includes an information receiving step for receiving volume information of the tank from a vehicle equipped with the tank, the flowrate of gas is controlled by using the volume information received in the information receiving step between starting of the supply of gas in the supply start step and stopping the supply of gas in the supply stop step, and the flowrate of gas is controlled by using the volume information estimated in the volume estimation step after the supply of gas is started again after the supply of gas is stopped in the supply stop step.

According to an eighth aspect of the present invention, in this case, it is preferable that the gas filling method further includes a small tank determination step for determining whether or not the tank is a small tank that has a predetermined volume or less, before the pre-start upstream pressure acquisition step is performed, and the pre-start upstream pressure acquisition step, the supply start step, the post-start upstream pressure acquisition step, the post-start flowrate acquisition step, the pressure loss estimation step, and the supply stop step are performed when the tank is determined not to be the small tank in the small tank determination step, and are not performed when the tank is determined to be the small tank.

According to a ninth aspect of the present invention, in this case, it is preferable that, in the small tank determination step, a pressure rise width in the supply source side that is a pressure in the supply source side of the piping at the time when gas is supplied in a predetermined mass or mass flowrate over a predetermined period is acquired, and the tank is determined to be the small tank when the rise width is larger than a predetermined width, and the tank is determined not to be the small tank when the rise width is the predetermined width or less.

According to a tenth aspect of the present invention, in this case, it is preferable that the gas filling method further includes a small tank determination step for determining whether or not the tank is a small tank that has a predetermined volume or less by using the pressure loss, after the pressure loss estimation step, and the supply stop step is performed when the tank is determined not to be the small tank in the small tank determination step, and is not performed when the tank is determined to be the small tank.

According to an eleventh aspect of the present invention, a gas filling method for connecting a tank that stores gas and a supply source that supplies gas by a piping, and filling gas in the tank, includes: a supply start step for starting the supply of gas from the supply source; a pre-stop upstream pressure acquisition step for acquiring a pre-stop upstream pressure that is a pressure in the supply source side of the piping before the stop of the supply of gas; a flowrate acquisition step for acquiring a pre-stop flowrate that is a flowrate of gas in the same period as the acquisition period of the pre-stop upstream pressure; a temporary stop step for stopping the supply of gas from the supply source after the pre-stop upstream pressure is acquired; a post-stop upstream pressure acquisition step for acquiring a post-stop upstream pressure that is a pressure in the supply source side of the piping after the supply of gas is stopped; a pressure loss estimation step for estimating the pressure loss generated in the piping at the time of the supply of gas by using the pre-stop upstream pressure, the post-stop upstream pressure, and the pre-stop flowrate; and a supply stop step for stopping the supply of gas so that a tank pressure that is a pressure in the tank conforms with a predetermined target pressure by using the pressure loss.

According to a twelfth aspect of the present invention, a gas filling method for connecting a tank that stores gas and a supply source that supplies gas by a piping, and filling gas in the tank, includes: a supply start step for starting the supply of gas from the supply source; an upstream pressure acquisition step for acquiring an upstream pressure that is a pressure in the supply source side of the piping during the supply of gas; and an upstream pressure fixed filling step for, after the upstream pressure reaches the vicinity of the predetermined target pressure that is set to a tank pressure that is a pressure in the tank, continuously supplying gas over a predetermined time while the upstream pressure is maintained to be a target pressure.

According to a thirteenth aspect of the present invention, in this case, it is preferable for the gas filling method to further include a minimum pressure loss filling step for, after the upstream pressure fixed filling step is performed, continuing the supply of gas over a predetermined time while maintaining the flowrate of gas to be a predetermined minimum flowrate, and then stopping the supply of gas from the supply source side. It should be noted that "minimum flowrate" in the present invention specifically refers to a rate that is larger than an extent in which check valves provided in the piping that connects the supply source and the tank, are maintained to open, and is an extent in which constant flow (substantially constant flowrate) can be kept in a device used in the supply source side.

In the first aspect of the present invention, three physical quantities of before and after the supply of a pre-start upstream pressure before the start of the supply of gas, a post-start upstream pressure after the start of the supply of gas, and a post-start flowrate in the same period as the acquisition period of the post-start upstream pressure, are acquired, and the pressure loss generated in the piping at the time of the supply of gas is estimated by using these. Furthermore, in the present invention, the supply of gas can be stopped at an appropriate timing so that a tank pressure that cannot be directly acquired in the supply source side, conforms with a target pressure, by using the pressure loss estimated after the start of the supply of gas. In the present invention, since the pressure loss can be acquired in early stage by estimating the pressure loss by using the physical quantities of before and after the start of the supply of gas in this way, the pressure loss acquired herein can be used when a timing for stopping the supply of gas is determined. In addition, the physical quantities acquired upon estimating the pressure loss are an upstream pressure and a flowrate of gas, and since any of these are physical quantities that can be measured by sensors provided in the supply source side, it is not necessary to provide a special device or perform processing for estimating the pressure loss.

In the second aspect of the present invention, the pressure loss is estimated after the supply of gas is started, the tank pressure during the supply of gas is estimated by using the pressure loss, the supply of gas is stopped so that the estimated tank pressure conforms with the target pressure, and a volume of the tank is estimated after the supply of gas is stopped. In the present invention, through the estimation of the pressure loss, after a tank pressure that cannot be directly acquired is increased accurately to the target pressure, the volume can be estimated. Accordingly, since the error of the sensors explained referencing FIG. 15 for estimating the volume of the tank, can be made as small as possible, the volume of the tank can be estimated accurately.

In the third aspect of the present invention, after the upstream pressure reaches the vicinity of the target pressure corresponding to the target of the tank pressure, the supply of gas is continued until the tank pressure reaches the target pressure while the upstream pressure is maintained to be the target pressure. During the supply of gas, the tank pressure becomes lower than the upstream pressure for the amount corresponding to the pressure loss generated in the piping. Therefore, when the filling is continued while the upstream pressure is maintained constant to be the target pressure as above, the tank pressure converges to the target pressure while the flowrate of gas is decreased. Accordingly, the filling of gas can be stopped, while the tank pressure is conformed with the target pressure accurately. In addition, check valves are provided in the piping, but there is variation in the operating pressure of the check valves. For this reason, even when the flowrate control valve in the supply device side are fully closed, the actual tank pressure may be shifted from the target due to the variation in the operating pressure of the check valves. In this regard, in the present invention, while the flowrate of gas is maintained to have small aperture, i.e., while a state where the check valves are opened is maintained, the tank pressure can be gradually approached to the target pressure.

In the fourth aspect of the present invention, when the tank pressure estimated by using the pressure loss, reaches the vicinity of the target pressure, the supply of gas is stopped. According to the present invention, upon stopping the supply of gas, since it is not necessary to make the flowrate of gas gradually to be 0 as the aforementioned third aspect of the invention time required for increasing the tank pressure to the target pressure can be reduced for that.

In the fifth aspect of the present invention, the pressure loss is estimated by using the physical quantities acquired before and after the supply of gas is started, as mentioned above. In the present invention, the pressure loss is estimated, in addition to that, by using the pre-stop upstream pressure, the post-stop upstream pressure, and the pre-stop flowrate acquired before and after the supply of gas is stopped. In the present invention, by estimating the pressure loss not only in the supply start time of gas but also in the supply stop time in this way, the estimation accuracy can be further improved.

In the sixth aspect of the present invention, by acquiring the post-start upstream pressure and the post-start flowrate in a plurality of different acquisition periods during the time since the flowrate of gas is 0 until the flowrate of gas reaches the predetermined target flowrate, and estimating the pressure loss using these, the estimation accuracy of the pressure loss can be improved.

In the seventh aspect of the present invention, since the supply of gas is started in the supply start step, until the supply of gas is stopped so that the tank pressure conforms with the target pressure in the supply stop step, i.e., during the initial filling when the accurate volume of the tank is not grasped, the flowrate of gas is controlled by using volume information sent from the vehicle. Thereby, the time required for initial filling can be made as short as possible.

In the eighth aspect of the present invention, it is necessary for the tank pressure to be accurately conformed with a predetermined target pressure, in order to accurately estimate the volume of the tank as mentioned above. In addition, as explained referencing FIG. 15, in order to reduce the error of the sensors, it is necessary for the target pressure to be set to be large to some extent. In other words, in order to accurately estimate the volume of the tank, it is necessary to experimentally fill some amount of gas while the accurate volume of the tank remains unclear. On the other hand, since with the small volume of the tank, the tank pressure and temperature rise quickly, sufficient amount of gas cannot be experimentally supplied, and performing the above described pre-start upstream pressure acquisition step and the like is not appropriate. Therefore, in the present invention, upon determining roughly whether or not the tank is the small tank having the predetermined volume or less first, the above described plurality of steps are performed only when it is not the small tank. Since the target pressure can be set to be sufficiently large valve by excluding the small tank in this way, the estimation accuracy of the volume of the tank can be improved.

In the ninth aspect of the present invention, by using the pressure rise width of the time when gas is supplied over a predetermined period, whether or not unknown tank is the small tank can be quickly determined without using a special device.

In the tenth aspect of the present invention, by estimating the pressure loss by using physical quantities of before and after the supply start of gas, the pressure loss can be acquired immediately after the supply of gas is started, as mentioned above. In addition, if using the acquired pressure loss, since the pressure in the tank can be estimated while gas is supplied, whether or not the currently connected tank is the small tank can be determined roughly. In the present invention, after the pressure loss estimation step, upon determining roughly whether or not the tank is the small tank by using the pressure loss acquired after the supply start of gas, the supply stop step is performed only when it is not the small tank. By excluding the small tank in this way, since the target pressure can be set to be sufficiently large value, the estimation accuracy of the volume of the tank can be improved. In addition, comparing with the eighth aspect of the invention, time required for filling can be shortened.

In the eleventh aspect of the present invention, three physical quantities of before and after the supply stop of a pre-stop upstream pressure before the stop of the supply of gas, a pre-stop flowrate in the same period as the acquisition period of the pre-stop upstream pressure, and a post-stop upstream pressure after the supply stop of gas, are acquired, and the pressure loss generated in the piping at the time of the supply of gas is estimated by using these. Moreover, in the present invention, by using the pressure loss estimated after the supply stop of gas, the supply of gas can be stopped at an appropriate timing so that the tank pressure that cannot be directly acquired conforms with the target pressure. In addition, the physical quantities acquired upon estimating the pressure loss are the upstream pressure and the flowrate of gas, and since any of these are physical quantities that can be measured by the sensors provided in the supply device side, it is not necessary to provide a special device or perform processing for estimating the pressure loss.

In the twelfth aspect of the present invention, if continuing supplying gas while maintaining the upstream pressure constant, the tank pressure that is the downstream pressure rises and the pressure difference between the upstream pressure and the tank pressure becomes small. In addition, as the pressure difference between the upstream pressure and the tank pressure approaches to 0 in this way, the flowrate of gas also approaches to 0 asymptotically. In addition, as the flowrate of gas approaches to 0, the pressure loss generated due to flowing of gas through the piping, also approaches to 0 asymptotically. In the present invention, by utilizing this, after the upstream pressure reaches the vicinity of the target pressure set to the tank pressure, the upstream pressure fixed filling step for continuously supplying gas while maintaining the upstream pressure to be the target pressure, is performed. Therefore, according to the twelfth aspect of the present invention, the tank pressure can be conformed with the target pressure without estimation of the pressure loss as the first aspect and the tenth aspect of the invention.

In the thirteenth aspect of the present invention, check valves are provided in the piping that connects the supply device and the tank, but there is variation in the operating pressure of the check valves. For this reason, even when the flowrate control valve in the supply device side are fully closed in the timing with which the tank pressure becomes the target pressure, and the supply of gas is completely stopped, the actual tank pressure may be shifted from the target pressure due to the variation in the operating pressure of the check valves. In this regard, in the present invention, after the upstream pressure fixed filling step is performed and the tank pressure approaches to the target pressure to some extent, the minimum pressure loss filling step for continuously supplying gas over a predetermined time while maintaining the flowrate of gas to be the minimum flowrate, is performed. Thereby, the variation in the operating pressure of the check valves can be prevented and the tank pressure can be conformed with the target pressure with higher accuracy. In addition, if performing the upstream pressure fixed filling step, since the flowrate of gas approaches to 0 asymptotically as described above, much time is required for converging the tank pressure to the target pressure. In this regard, in the present invention, by performing the upstream pressure fixed filling step for a predetermined time and making the tank pressure approach to the target pressure to some extent, and then performing the minimum pressure loss filling step, time required for filling can be shortened while making the tank pressure approach the target pressure.

DETAILED DESCRIPTION OF THE INVENTION

<First Embodiment>

Figure 1:
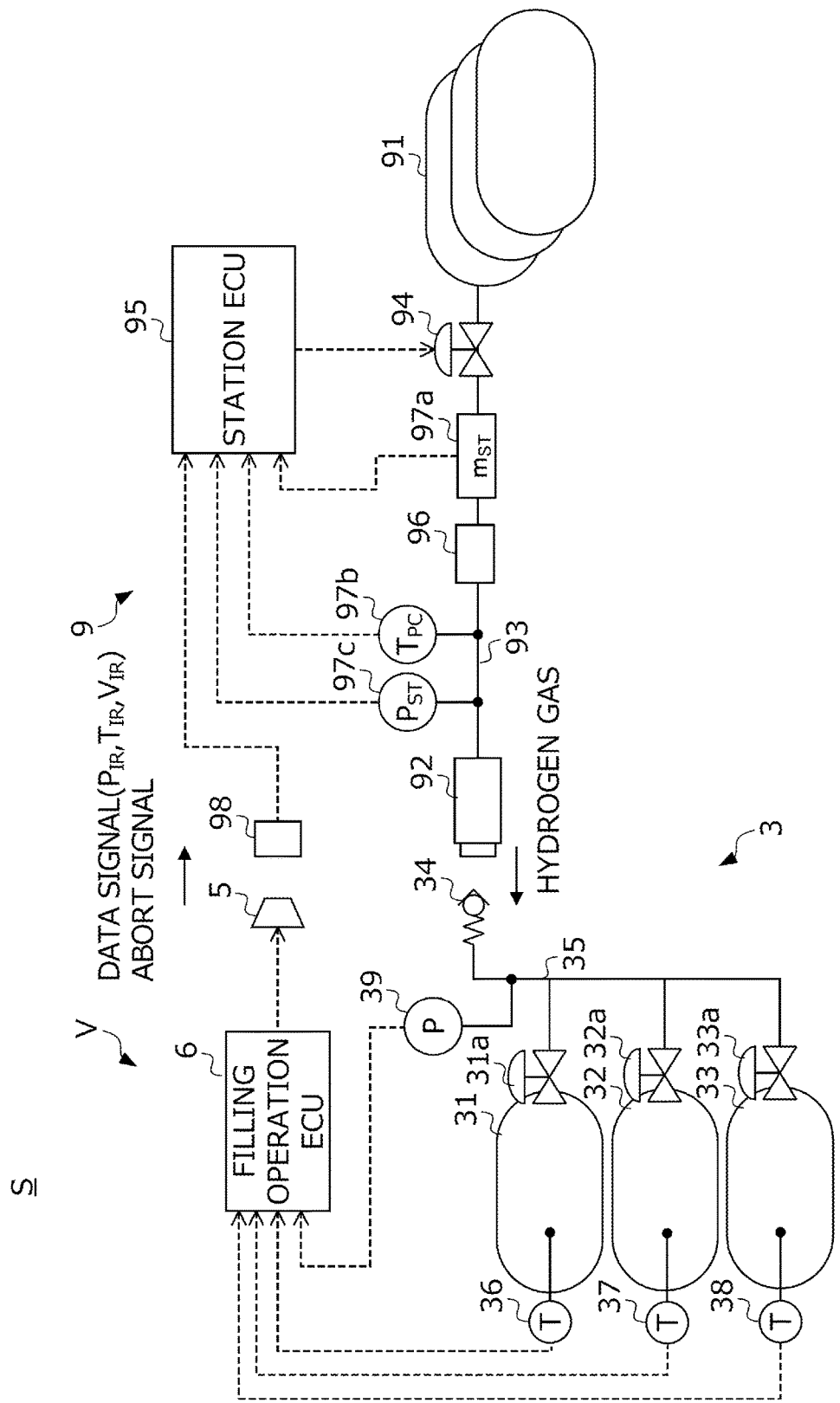
FIG. 1 is a view showing the configuration of a hydrogen filling system to which the hydrogen gas filling method according to the first embodiment of the present invention is applied.

A first embodiment of the present invention will be explained hereinafter while referencing the drawings. FIG. 1 is a view showing the configuration of a hydrogen filling system S to which the hydrogen gas filling method according to the present embodiment is applied. The hydrogen filling system S is configured by combining a fuel cell vehicle V that travels with hydrogen gas as the fluid fuel, and a hydrogen station 9 serving as a supply device that supplies hydrogen gas to a hydrogen tank of this vehicle V. Hereinafter, first, the configuration on the vehicle V side will be explained, and then the configuration on the hydrogen station 9 side will be explained.

<Configuration of Fuel Cell Vehicle V>

The fuel cell vehicle V includes a hydrogen tank system 3 that stores hydrogen gas supplied from the hydrogen station 9, a filling operation ECU 6 that generates data signals including information related to the hydrogen tank system 3, and an infrared transmitter 5 that sends the data signals generated by the filling operation ECU 6 to the hydrogen station 9. It should be noted that illustrations for the configurations of the vehicle body and the fuel cell system that generates electricity using the hydrogen gas stored in the hydrogen tank system 3, and configurations such as the drive system that causes the vehicle body to move using the electric power generated by the fuel cell system are omitted in the vehicle V in FIG. 1.

The hydrogen tank system 3 includes a plurality of (e.g., three) hydrogen tanks 31, 32 and 33 that store hydrogen gas, a receptacle 34 to which the nozzle of the hydrogen station 9 is connected during filling of hydrogen gas, and vehicle piping 35 that connects this receptacle 34 and each of the hydrogen tanks 31 to 33, temperature sensors 36, 37 and 38 that detect the temperatures inside the respective hydrogen tanks 31 to 33, and a pressure sensor 39 that detects the pressure inside the hydrogen tanks 31 to 33. The hydrogen gas pressure fed from the hydrogen station 9 during the filling is filled into each of the hydrogen tanks 31 to 33 via this vehicle piping 35.

In addition, master valves 31a, 32a and 33a are provided to these hydrogen tanks 31, 32 and 33, respectively. For example, in the case of being during travel of the vehicle V, since hydrogen gas stored inside of the hydrogen tanks 31 to 33 is supplied to the fuel cell system that is not illustrated, these master valves 31a to 33a are open. In addition, these master valves 31a to 33a are each made so as to be able to open and close manually by an operator, in consideration of maintenance time of the vehicle V. Herein, there may be cases where hydrogen gas is filled from the hydrogen station 9 while the master valve remains closed due to some reasons, but in such cases, a gap between a volume transmitted value $V_{IR}$ described later transmitted from the vehicle V to the hydrogen station 9 and the volume of the actual hydrogen tank, is generated.

It should be noted that, hereinafter, for a configuration including a plurality of hydrogen tanks 31 to 33 as in the vehicle V of FIG. 1, cases of simply referring to "hydrogen tank" shall indicate a single hydrogen tank virtually configured by combining this plurality of hydrogen tanks 31 to 33. Since hydrogen gas is filled into each hydrogen tank under substantially the same conditions, the hydrogen tank will not be hindered even when assuming as a configuration that is singular.

Each of the temperature sensors 36 to 38 detects the temperature of hydrogen gas in the respective hydrogen tanks 31 to 33, and sends a signal corresponding to the detected value to the filling operation ECU 6. In addition, the pressure sensor 39 detects the pressure in the hydrogen tank 31 in the vehicle piping 35, and sends a signal corresponding to the detected value to the filling operation ECU 6.

The filling operation ECU 6 is a microcomputer configured by an interface that performs A/D conversion on the detection signals of the above-mentioned sensors 36 to 39, a CPU that executes the signal generation processing described later, a drive circuit that drives the infrared transmitter 5 in a state determined under the above-mentioned processing, a storage device that stores various data, and the like.

Programs related to the execution of the data signal generation processing described later, and characteristic information including the capacity values of the hydrogen tanks 31 to 33 equipped at the time at which the vehicle V is manufactured are recorded in the storage device of the filling operation ECU 6. The hydrogen tank system 3 as mentioned above is configured by combining a plurality of the hydrogen tanks 31 to 33. Therefore, capacity value included in this characteristic information is the total value of the capacity values of the hydrogen tanks 31 to 33 at the time of manufacture. It should be noted that, in addition to the capacity value of the hydrogen tank, for example, information related to the hydrogen tank that can be specified at the time of manufacture such as the volume derived by a known conversion law from the capacity value and the material of the hydrogen tank is included in this characteristic information.

The CPU of the filling operation ECU 6 starts signal generation processing to generate signals to be transmitted from the transmitter 5 to the hydrogen station 9, with the event of a fuel lid protecting the receptacle 34 being opened. In addition, the CPU of the filling operation ECU 6 ends the signal generation processing, with the event of entering a state in which filling of hydrogen gas becomes impossible by the above-mentioned nozzle being removed from the receptacle 34, or the fuel lid being closed, for example.

In the signal generation processing, a temperature transmitted value $T_{IR}$ corresponding to the current value of the temperature in the hydrogen tank, a pressure transmitted value $P_{IR}$ corresponding to the current value of the pressure in the hydrogen tank, and a volume transmitted value $V_{IR}$ corresponding to the current value of the volume of the hydrogen tank are acquired every predetermined period, and a data signal according to these values ($T_{IR}$, $P_{IR}$, and $V_{IR}$) is generated. For the temperature transmitted value $T_{IR}$, for example, the average value for the detection values of the above-mentioned three temperature sensors 36 to 38, or a detection value of a representative one decided in advance among the three temperature sensors 36 to 38 is used. For the pressure transmitted value $P_{IR}$, for example, the detection value of the pressure sensor 39 at this time is used. In addition, for the volume transmitted value $V_{IR}$, a value recorded in the aforementioned storage device is used. It should be noted that, among these sending values $T_{IR}$, $P_{IR}$ and $V_{IR}$, the $T_{IR}$ and $P_{IR}$ are values that successively vary during the filling; however, $V_{IR}$ is a fixed value that does not vary during the filling.

In addition, in the signal generation processing, the temperature transmitted value $T_{IR}$ and the pressure transmitted value $P_{IR}$ acquired periodically as mentioned above and abort thresholds decided in advance for each sending value are compared, and in the case of either of these sending values exceeding the abort threshold during the filling, an abort signal for requesting ending of filling to the hydrogen station 9 is generated.

The drive circuit of the filling operation ECU 6 causes the infrared transmitter 5 to be driven (flash) according to the data signals and abort signal generated by the above-mentioned signal generation processing. Thereby, data signals including state information related to the state inside the hydrogen tank (i.e. temperature transmitted value $T_{IR}$, pressure transmitted value $P_{IR}$, and the like) as well as characteristic information (i.e. volume transmitted value $V_{IR}$, and the like) and abort signals are thereby sent to the hydrogen station 9.

<Configuration of Hydrogen Station 9>

The hydrogen station 9 includes a pressure accumulator 91 in which hydrogen gas to be supplied to the vehicle V is stored at high pressure, a station piping 93 from the pressure accumulator 91 leading to a filling nozzle 92 which is directly operated by the operator, a flowrate control valve 94 provided in the station piping 93, and a station ECU that opens and closes the flowrate control valve 94 in order to control the flowrate of hydrogen gas (hereinafter also referred to as "filling flowrate") flowing in the station piping 93.

A precooler 96 that cools the hydrogen gas is provided in the station piping 93 between the flowrate control valve 94 and the filling nozzle 92. By cooling the hydrogen gas at a position ahead of filling to the hydrogen tank of the vehicle V by such a precooler 96, a temperature rise of the hydrogen gas in the hydrogen tank is suppressed, and thus rapid filling becomes possible.

A plurality of sensors 97a, 97b and 97c for detecting various physical quantities related to the filling of hydrogen gas is provided to the hydrogen station 9.

A mass flow meter 97a is provided in the station piping 93 between the flowrate control valve 94 and the precooler 96, detects the mass flowrate of hydrogen gas flowing in the station piping 93, and sends a signal corresponding to the detection value to the station ECU 95.

The gas temperature sensor 97b is provided in the station piping 93 between the precooler 96 and the filling nozzle 92, detects the temperature of hydrogen gas in the station piping 93, and sends a signal corresponding to the detection value to the station ECU 95.

The station pressure sensor 97c is provided in the station piping 93 between the precooler 96 and the filling nozzle 92, detects the pressure of hydrogen gas inside the station piping 93, and sends a signal corresponding to the detection value to the station ECU 95.

An infrared receiver 98 for receiving data signals sent from the vehicle V is provided to the filling nozzle 92. The infrared receiver 98, when connecting the filling nozzle 92 to the receptacle 34, faces the infrared transmitter 5 of the vehicle V, whereby sending and receiving of data signals and abort signals (hereinafter referred to as "data signals, and the like") via infrared rays becomes possible between this transmitter 5 and receiver 98. When receiving data signals, etc. transmitted from the infrared transmitter 5, the infrared receiver 98 sends these to the station ECU 95. The sending and receiving of data signals, and the like is thereby realized between the filling operation ECU 6 and the station ECU 95. The sending and receiving of data signals, and the like via infrared rays between this transmitter 5 and receiver 98 is hereinafter also referred to as IR communication.

The station ECU 95 fills hydrogen gas according to the sequence explained as follows by using the output of the sensors 97a to 97c provided on the station side and the data signals by IR communication, in response to the filling of hydrogen gas and IR communication becoming possible by the filling nozzle 92 being connected to the receptacle 34 of the vehicle V.

Figure 2:
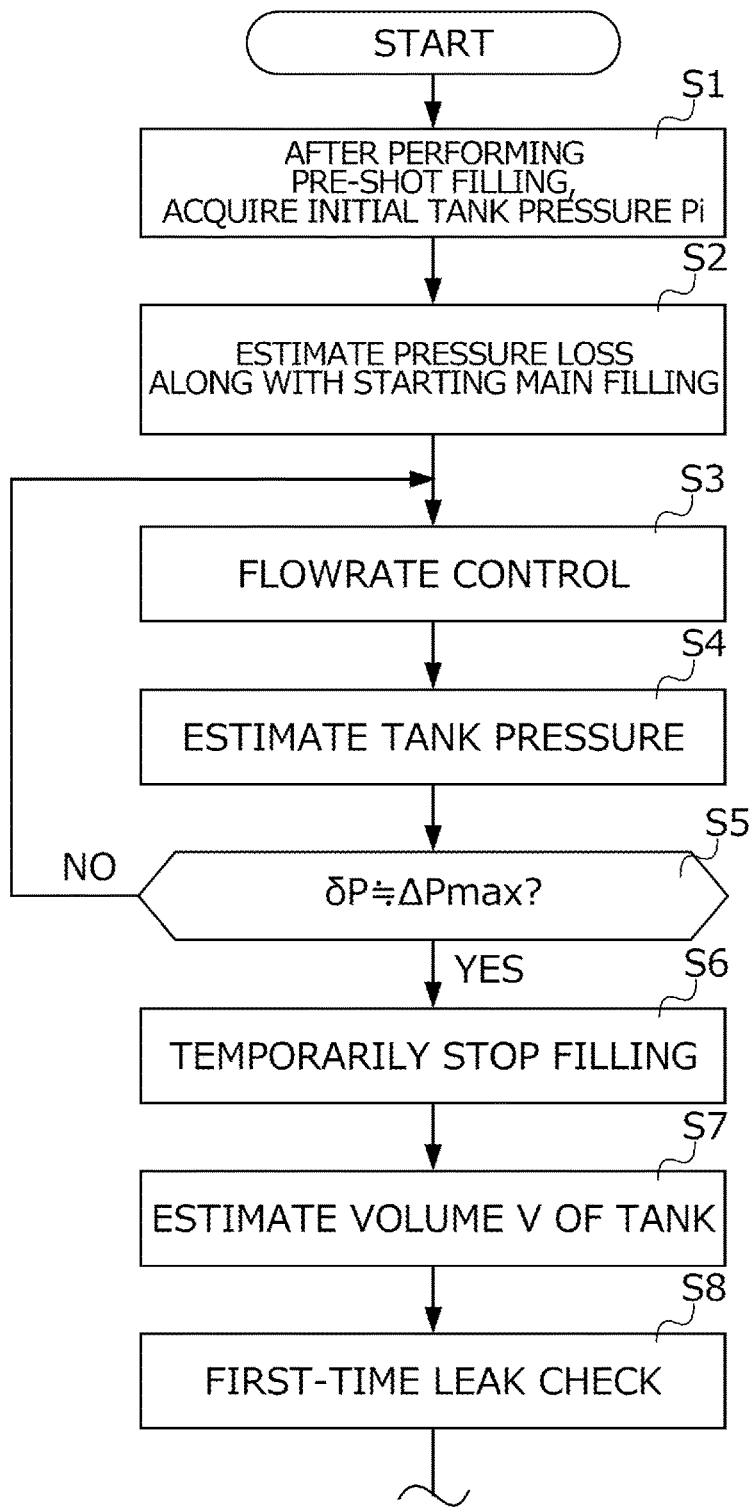
FIG. 2 is a flowchart showing a specific sequence of the hydrogen gas filling method according to the present embodiment.

FIG. 2 is a flowchart showing a specific sequence of the hydrogen gas filling method for connecting the hydrogen tank equipped in the vehicle and the pressure accumulator of the hydrogen station with one piping configured by connecting the station piping and the vehicle piping in series and filling hydrogen gas in the tank. The processing of FIG. 2 starts in response to that the user performs a predetermined operation for filling hydrogen gas in the vehicle in the hydrogen station. It should be noted that FIG. 2 illustrates only processing that is performed in the initial stage of filling that is from the filling of hydrogen gas is started until the first-time leak check described later is finished, among processing performed until the hydrogen tank is refilled.

Figure 3:
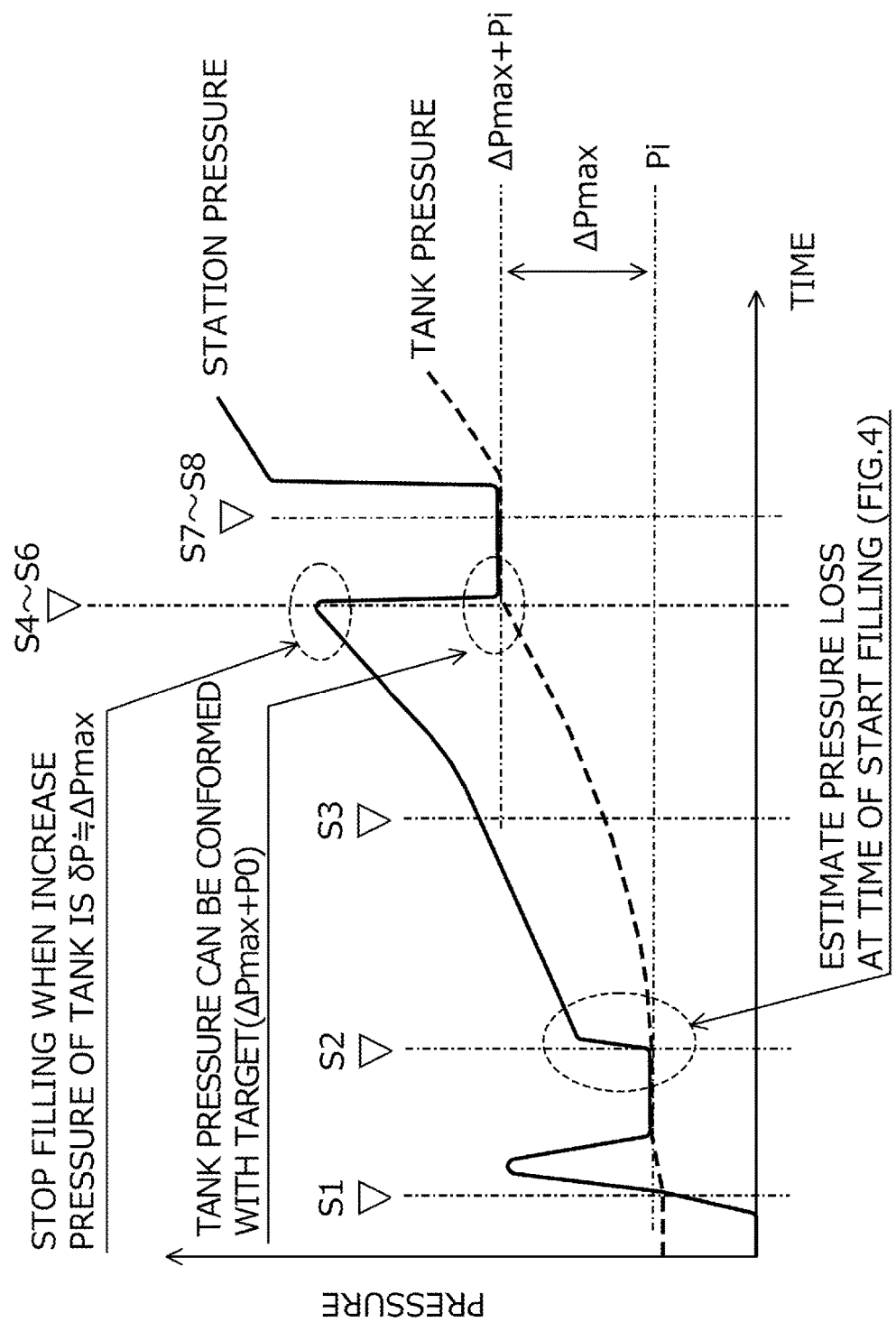
FIG. 3 is a time chart showing the variation with time of the station pressure and the tank pressure in the case of filling hydrogen gas by the flowchart of FIG. 2.

FIG. 3 is a time chart showing the variation with time of the station pressure and the tank pressure in the case of filling hydrogen gas by the flowchart of FIG. 2. The hydrogen gas filling method of FIG. 2 will be explained in detail hereinafter while referencing the time chart of FIG. 3 as appropriate.

First, in S1, after forming pre-shot filling for a predetermined time, the hydrogen station acquires the value of the initial tank pressure Pi by using the output of the station pressure sensor, and then the processing advances to S2. Herein, the pre-shot filling is processing that equalizes pressure in the station piping and the hydrogen tank by experimentally filling hydrogen gas of an amount on the order of several tens to hundreds of grams over a few seconds. After such pre-shot filling is performed, since the station pressure and the tank pressure are equal, the tank pressure can be acquired by using the station pressure sensor. Hereinafter, filling after this pre-shot filling ends is defined as main filling. In addition, hereinafter, the initial tank pressure Pi acquired in S1 is defined as a tank pressure immediately before the main filling starts.

In S2, the hydrogen station starts the main filling by opening the flowrate control valve and estimates the pressure loss generated in the piping that connects the hydrogen station and the hydrogen tank at the time of the supply of hydrogen gas by utilizing the step-like rise of the station pressure associated with the start of the main filling.

Figure 4:
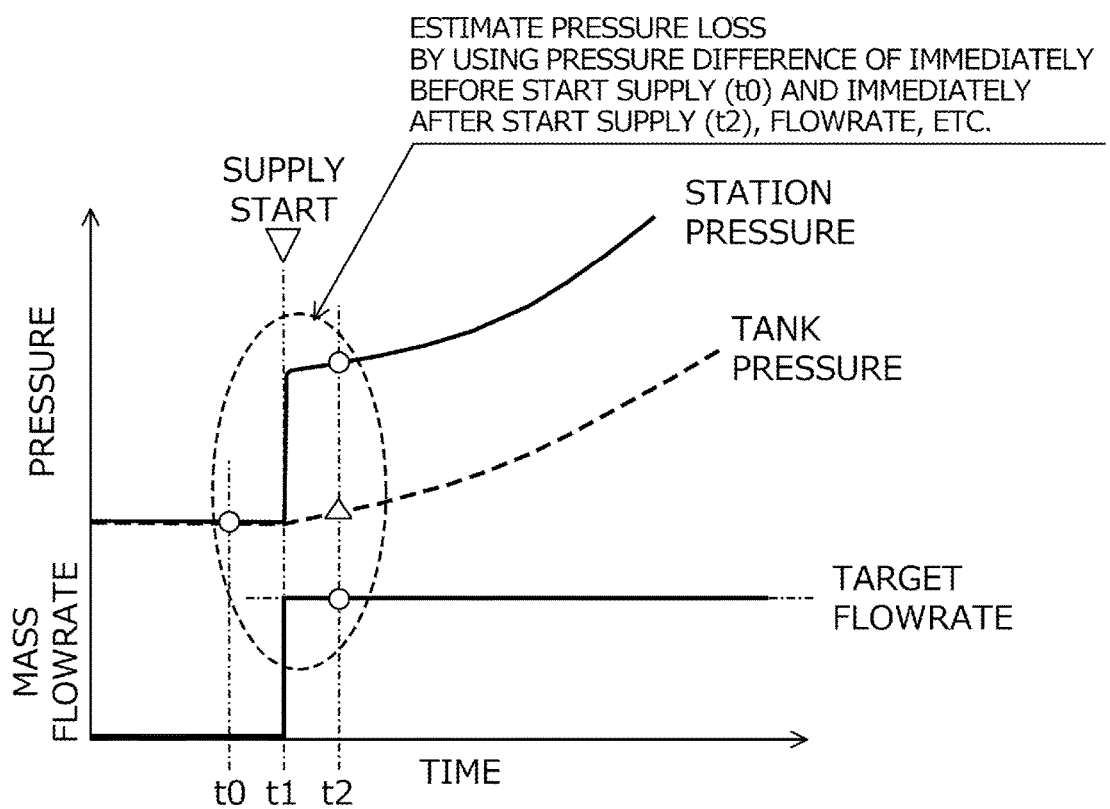
FIG. 4 is a view for explaining a sequence of estimating the pressure loss.

FIG. 4 is a time chart showing the variation of the station pressure and the tank pressure before and after the main filling starts in S2 and a view for explaining a sequence of estimating the pressure loss.

As shown in FIG. 4, when the flowrate control valve of the hydrogen station is opened to start the main filling, since hydrogen gas flows into the hydrogen tank from the pressure accumulator of the hydrogen station via the station piping and the vehicle piping, the tank pressure starts rising gradually. In addition, the pressure loss is generated in the piping, a pressure difference that becomes large according to the flowrate of hydrogen gas, between the station pressure and the tank pressure is generated, as shown in FIG. 4. For this reason, the station pressure rises in a step-like manner before and after the main filling starts and after that, it gently rises according to the rise of the tank pressure.

Herein, in a case of assuming the pressure accumulator and the hydrogen tank are connected by only a cylindrical piping, the pressure difference (ΔP=Pstation−Ptank) generated between the station pressure Pstation and the tank pressure Ptank due to the pressure loss when hydrogen gas is supplied from the pressure accumulator to the hydrogen tank with the mass flowrate dm, is represented by the following simplified formula (1).

$$dm = \sqrt{\frac{\Delta P \cdot \rho}{k}} \quad (1)$$

In the above formula (1), "ρ" is an average gas density in the piping and the value thereof can be calculated by searching a predetermined arithmetic expression and map with the temperature Tgas of hydrogen gas and the pressure difference ΔP as arguments. In addition, in the above formula (1), "k" is the energy loss generated due to flowing of hydrogen gas through the piping, i.e., the pressure loss coefficient that represents the magnitude of the pressure loss. Since the specific value of the pressure loss coefficient k is derived from the shape, structure, or the like of the piping, it differs depending on the model of the vehicle connected to the hydrogen station. In addition, by varying the above formula (1), following formula (2) for calculating the value of unknown pressure loss coefficient k is derived.

$$k = \frac{dm^2}{\Delta P \cdot \rho} = \frac{dm^2}{(Pstation - Ptank) \cdot \rho(Tgas, (Pstation - Ptank)/2)} \quad (2)$$

In the right side of the above formula (2), the value of any of the mass flowrate dm of hydrogen gas, the station pressure Pstation, the temperature Tgas of hydrogen gas, and the function form of the average gas density p, can be acquired in the station side at any time. In other words, the value of the mass flowrate dm of hydrogen gas can be acquired by using the mass flow meter provided in the hydrogen station, the value of the station pressure Pstation can be acquired by using the station pressure sensor provided in the hydrogen station, and the value of the temperature Tgas of hydrogen gas can be acquired by using the gas temperature sensor provided in the hydrogen station, respectively. In addition, the function form of the average gas density p can be specified by performing an experiment beforehand.

In the right side of the above formula (2), the one that cannot be acquired in the hydrogen station at any time is only the tank pressure Ptank. In the hydrogen station, unknown tank pressure is estimated by utilizing the station pressure rises in a step-like manner from a state of being substantially equal to the tank pressure before and after starting of the supply of hydrogen gas. In other words, it is appropriate that, as shown in FIG. 4 for example, when the supply of hydrogen gas is started at time t1, the value of the tank pressure Ptank (triangle mark in FIG. 4) at time t2 immediately after the t1 is replaced with the value of the station pressure Pstation at time t0 that is immediate before the start of the supply.

In S2, the specific sequence of calculating the value of the pressure loss coefficient k is as follows. The hydrogen station acquires the value of the station pressure Pstation at time t0 immediately before the start of the supply of hydrogen gas (hereinafter, this is noted as "P0"), first. Next, at time t1, the hydrogen station opens the flowrate control valve and starts the supply of hydrogen gas. Next, the hydrogen station acquires the value of the station pressure Pstation at time t2 immediately after the start of the supply of hydrogen gas and the hydrogen gas temperature Tgas and the mass flowrate dm at the same time t2, and substitutes these for the following formula (3) to calculate the value of the pressure loss coefficient k.

$$k = \frac{dm^2}{(Pstation - P0) \cdot \rho(Tgas, (Pstation - P0)/2)} \quad (3)$$

Referring back to FIG. 2, after starting the main filling and estimating the pressure loss as above, the hydrogen station continues filling while controlling the mass flowrate of hydrogen gas at a predetermined target flowrate (refer to S3). It should be noted that until the accurate volume of the hydrogen tank is grasped in the hydrogen station side in step S7 described later, the target flowrate of hydrogen gas may be determined not according to the vehicle type in hydrogen station and may be determined by using the volume transmitted value $V_{IR}$ transmitted from the vehicle and received at the hydrogen station.

In S4, the hydrogen station estimates the tank pressure Ptank during the supply of hydrogen gas by using the pressure loss coefficient k acquired in S2. In other words, the value of the tank pressure Ptank during the supply of hydrogen gas at the mass flowrate dm can be calculated by the following formula (4) that can be acquired by varying the formula (1) by using the value of the station pressure Ps at the time and the value of the pressure coefficient k acquired in S2.

$$Ptank = Pstation - \frac{dm^2}{k\rho} \quad (4)$$

In S5, the hydrogen station determines whether or not an increase pressure δP that is acquired by subtracting the initial tank pressure Pi acquired in S1, from the tank pressure Ptank at current time point estimated in S4, reaches the vicinity of a predetermined upper limit pressure ΔPmax (for example, 5 MPa) determined for measuring the timing to start the first-time leak check (δP≈ΔPmax?). In the case of the determination of S5 being NO, the hydrogen station returns to S3 and continues filling. In the case of the determination of S5 being YES, the hydrogen station temporarily stops filling of hydrogen gas to perform the first-time leak check (refer to S6).

In the hydrogen station of the present embodiment as above, by estimating the pressure loss at the time of the start of main filling, estimating the tank pressure Ptank and the increase pressure δP due to the filling during the filling of hydrogen gas by using the pressure loss, and further, stopping the filling when the increase pressure δP reaches the vicinity of the upper limit pressure ΔPmax, the filling of hydrogen gas can be stopped so that the tank pressure Ptank that cannot be directly acquired in the hydrogen station side, conforms with the target pressure (ΔPmax+Pi) that is determined by the upper limit pressure ΔPmax.

In S7, the hydrogen station estimates the volume V [m³] of the hydrogen tank currently connected by using the following formula (5-1).

$$V = \frac{\sum m}{d\sigma} \quad (5\text{-}1)$$

$$d\sigma = \sigma(Pe, Te) - \sigma(Pi, Ti) \quad (5\text{-}2)$$

In the right side of the estimation formula (5-1), "Σm" [kg] is hydrogen amount [kg] that has been filled in the hydrogen tank during a time since the main filling is started (i.e., from when the initial tank pressure Pi is measured in S1) until filling is temporarily stopped in S6, and the value thereof is calculated by integrating the output of the mass flow meter provided in the hydrogen station. In addition, the "dσ" [kg/m³] is a hydrogen gas density variation amount [kg/m³] in the hydrogen tank during the time since the main filling is started in S2 until the filling is temporarily stopped in S6, and the value thereof is calculated by subtracting the hydrogen gas density (σ(Pi,Ti)) in the hydrogen tank at the time when the main filling is started from the hydrogen gas density (σ(Pe,Te)) in the hydrogen tank at the time when the filling is temporarily stopped, as shown in the formula (5-2).

In addition, the hydrogen gas density in the hydrogen tank at each time can be calculated by searching a predetermined map on the basis of the tank pressure and the tank temperature at each time. Herein, as the value of the tank temperature Ti at the time when the filling is started, the temperature transmitted value $T_{IR}$ transmitted from the vehicle and received in the hydrogen station before the pre-shot filling is performed in S1 is used, for example. In addition, as the value of the tank pressure Pi at the time when the filling is started, the value acquired in S1 is used. As the value of the tank temperature Te at the time when the filling is stopped, the temperature transmitted value $T_{IR}$ transmitted from the vehicle and received in the hydrogen station in S6, is used, for example. In addition, as the value of the tank pressure Pe at the time when the filling is stopped, the value acquired by using the output of the station pressure sensor under the condition where the pressure in the station piping and the hydrogen tank are equalized after the filling of hydrogen gas is temporarily stopped in S6, is used, for example.

Figure 15:
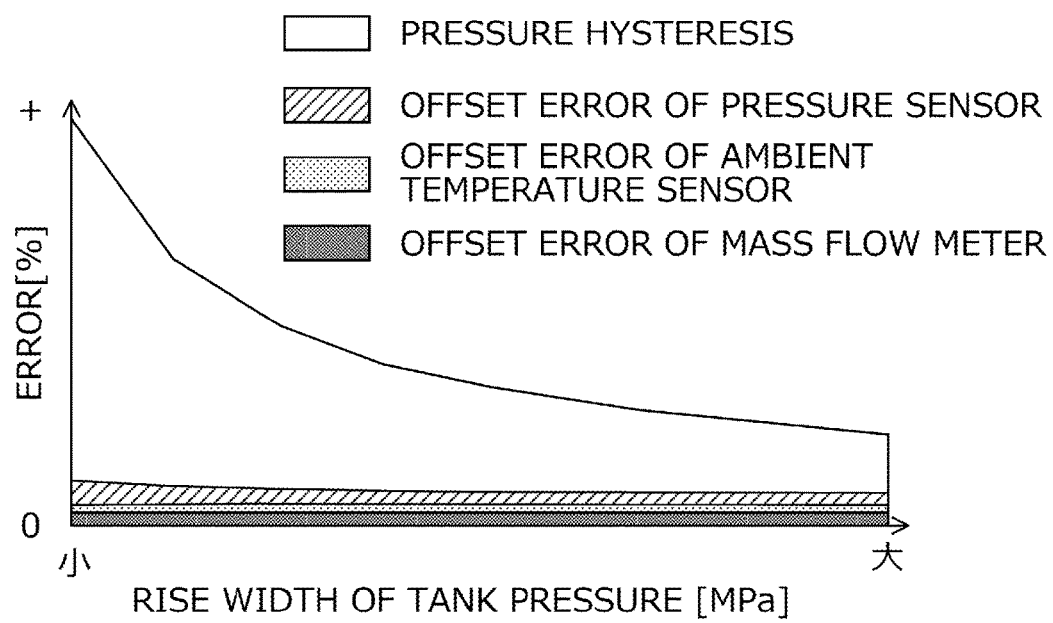
FIG. 15 is a view showing the magnitude and breakdown of the error of various types of sensors affecting on the volume estimation result.

Herein, factors of the error of the volume V of the hydrogen tank estimated by the formula (5-1) are considered. When the volume V is estimated by the formula (5-1), the output of the pressure sensor after stopping of the filling of hydrogen gas is used as above. However, as explained referencing FIG. 15, the largest factor of the error in estimating the volume V is derived from the pressure hysteresis error and the error becomes smaller as the difference of filling pressure (dP) becomes higher. Therefore, in the hydrogen station of the present embodiment, the volume V is estimated after the filling is stopped at an appropriate timing so as to conform with the target pressure (ΔPmax+Pi) determined by the upper limit pressure ΔPmax accurately as above. In other words, the volume V is estimated after the tank pressure is increased to the maximum within a range allowed by the upper limit pressure ΔPmax, the pressure hysteresis error becomes minimum and as a result, the volume V of the hydrogen tank can be estimated accurately.

After that, the hydrogen station performs the first-time leak check (refer to S8) and restarts filling of hydrogen gas when confirmed that there is no leak. It should be noted that after the first-time leak check is finished, it is preferable that by using the volume V of the hydrogen tank estimated in S7, the flowrate of hydrogen gas is controlled and the timing to finish the filling is determined, in a manner suitable for the volume V.

Although a hydrogen gas filling method according to a first embodiment of the present invention has been explained above, the present invention is not to be limited thereto. The configurations of the detailed parts may be modified as appropriate within the scope of the gist of the present invention. Specifically, Modifications 1 to 4 as follows and combining of the Modifications 1 to 4 are considered.

<Modification 1>

In the above-mentioned hydrogen gas filling method of a first embodiment, the value of the pressure loss coefficient k is calculated by using the value of the station pressure Pstation and the value of the mass flowrate dm in the acquisition time t2 that is one point immediately after the start of the supply of hydrogen gas, as explained referencing FIG. 4; however, the present invention is not limited thereto.

Figure 5:
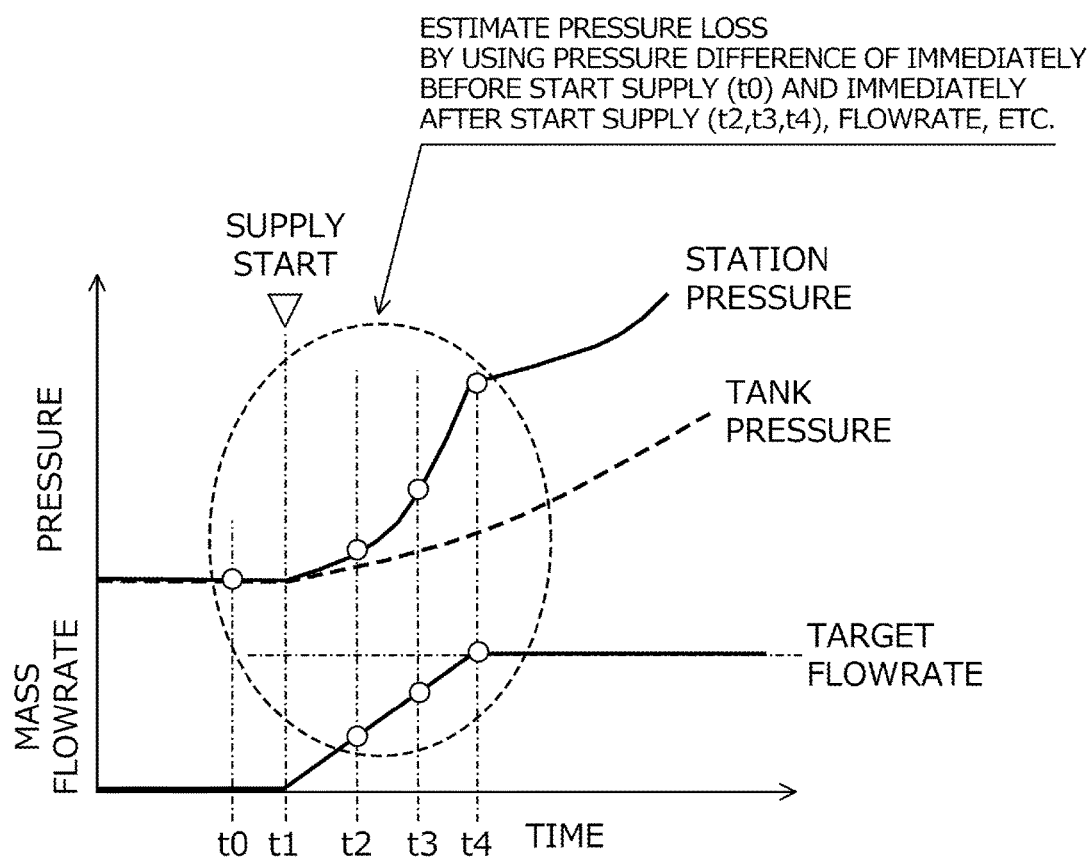
FIG. 5 is a view for explaining a sequence of estimating the pressure loss (Modification 1)

As shown in FIG. 5, for example, the value of the pressure loss coefficient k may be calculated by making the start of the mass flowrate of hydrogen gas to be gentle, acquiring the value of the station pressure Pstation and the mass flowrate dm at two or more different acquisition times t2, t3, and t4 that is times during since the mass flowrate of the hydrogen gas is 0 until it reaches a predetermined target flowrate.

Due to the specification of the flowrate control valve provided in the hydrogen station, there are ones that cannot increase the mass flowrate of hydrogen gas quickly to a predetermined target flowrate as shown in FIG. 5. The hydrogen gas filling method shown in the present Modification 1 is suitable for a case where such flowrate control valve is used.

<Modification 2>

In the above-mentioned hydrogen gas filling method of a first embodiment, the filling of hydrogen gas is temporarily stopped when the increase pressure δP that is estimated by using the pressure loss reaches the vicinity of the upper limit pressure ΔPmax, so that the tank pressure Ptank conforms with the target pressure (ΔPmax+Pi), as explained referencing FIGS. 2 and 3; however, the method for conforming the tank pressure Ptank with the target pressure (ΔPmax+Pi) is not limited thereto.

Figure 6:
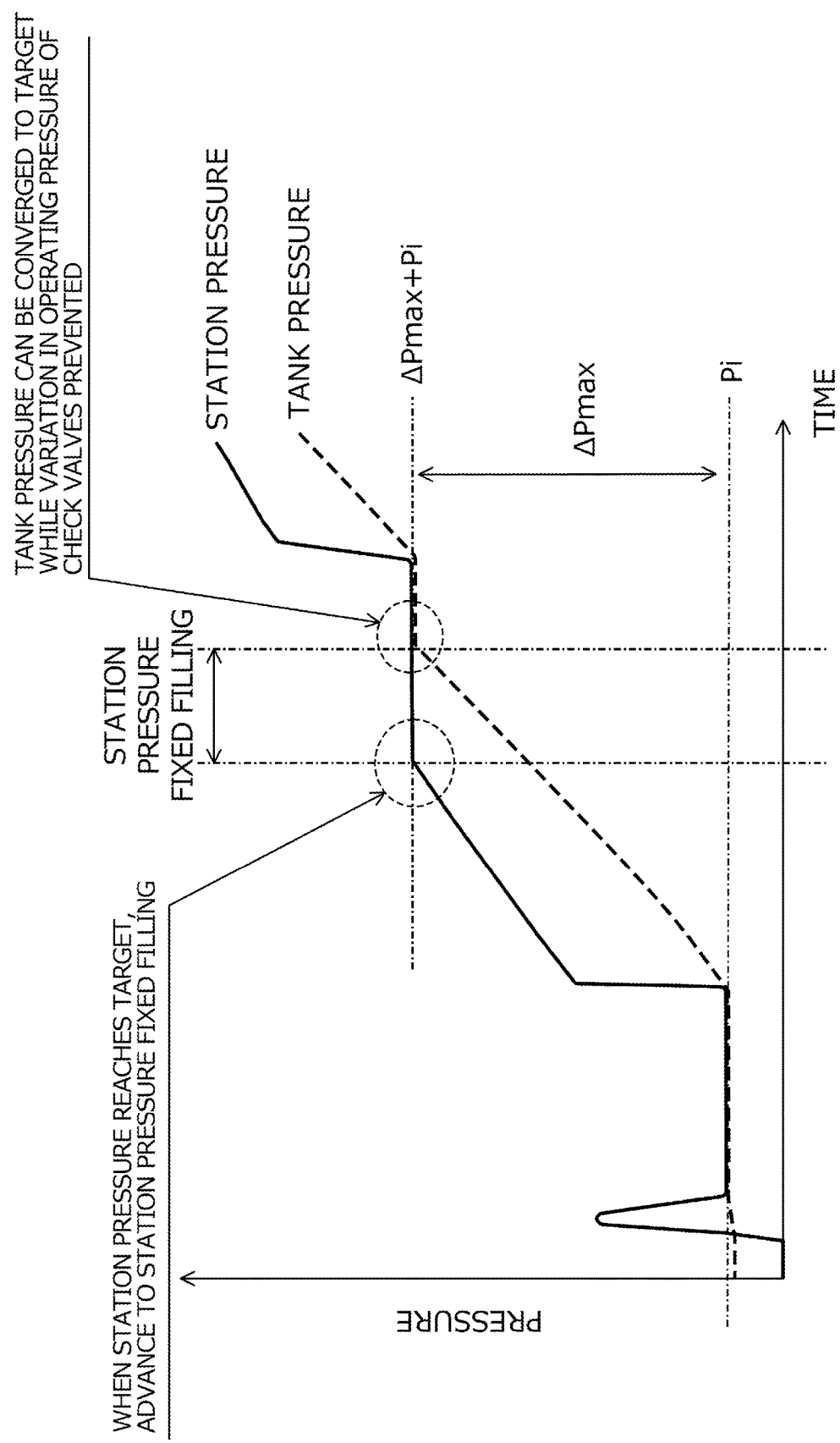
FIG. 6 is a view for explaining a sequence of the station pressure fixed filling (Modification 2)

As shown in FIG. 6, for example, after the station pressure Pstation reaches the vicinity of the target pressure (ΔPmax+Pi) determined to the tank pressure Ptank during the supply of hydrogen gas, the tank pressure Ptank may be converged to the target pressure (ΔPmax+Pi) by taking a predetermined time, by continuing the supply of hydrogen gas until the increase pressure δP reaches the upper limit pressure ΔPmax, while maintaining the station pressure Pstation in the vicinity of this target pressure (ΔPmax+Pi). Such filling method is hereinafter also referred to as station pressure fixed filling.

Herein, when continuing the filling while maintaining the station pressure Pstation constant, the pressure difference between the station pressure Pstation and the tank pressure Ptank gradually becomes small, and therefore the mass flowrate of hydrogen gas also gradually becomes small. Therefore, there is a disadvantage that, when the station pressure fixed filling of FIG. 6 is performed, it takes longer time for filling for that. However, there is an advantage that, when the station pressure fixed filling is performed as explained hereinafter, the tank pressure Ptank can be conformed with the target pressure (ΔPmax+Pi) with high accuracy.

In the piping that connects the pressure accumulating and the hydrogen tank of the vehicle, check valves are provided but there is variation in the operating pressure of the check valves. For this reason, even when flow control valves in the hydrogen station are fully closed at an appropriate timing so that the tank pressure conforms with the target, the actual tank pressure may be shifted from the actual tank pressure due to the variation in the operating pressure of the check valves. In this regard, the station pressure fixed filling shown in FIG. 6 is performed, the tank pressure can be gradually approached to the target while the flowrate control valve in the hydrogen station are maintained to have a small aperture, i.e., the state where the check valves are maintained to open. Therefore, although time required for filling becomes long by the station pressure constant filling is performed, the tank pressure can be conformed to the target accurately, and as a result, the estimation accuracy of the volume of the hydrogen tank can also be improved.

<Modification 3>

In the hydrogen gas filling method of the above described first embodiment, as explained referencing FIG. 4, the pressure loss is estimated by utilizing that the station pressure increases in a step-like manner in starting of the main filling. However, this method can be applied not only to the time when the station pressure increases in a step-like manner, but also to the time when the station pressure decreases in a step-like manner, for example.

Figure 7:
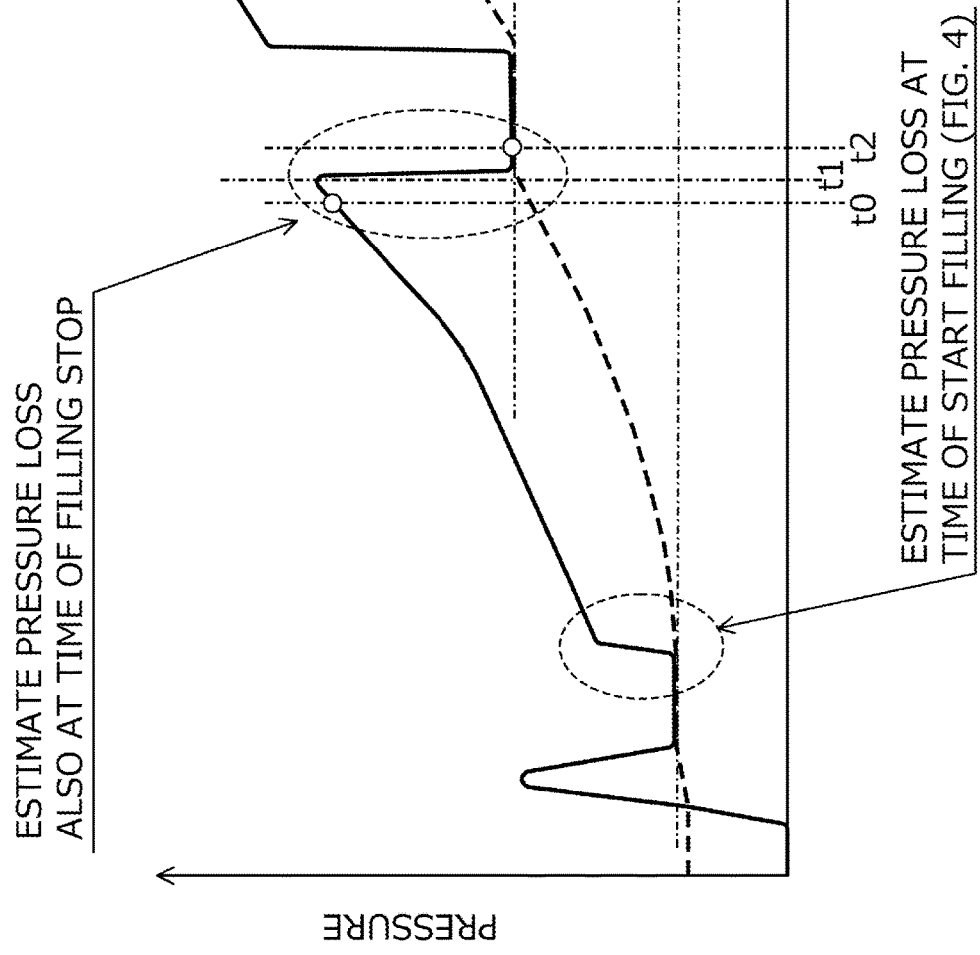
FIG. 7 is a view for explaining a sequence of estimating the pressure loss (Modification 3)

FIG. 7 shows a case of estimating the pressure loss at another timing from the supply start of hydrogen gas, by using the station pressure or the like acquired before and after the supply of hydrogen gas is temporarily stopped for performing the first-time leak check.

In this case, the hydrogen station acquires the value of the station pressure Pstation at time t0 immediate before the stop of the supply of hydrogen gas and the value of the hydrogen gas temperature Tgas and the mass flowrate dm at the same time t0, first. Next, at time t1, the hydrogen station closes the flowrate control valve and stops the supply of the hydrogen gas. Next, the hydrogen station acquires the value of the station pressure Pstation at time t2 immediately after the stop of the supply of hydrogen gas (noted as "P0" in the present Modification). Next, the hydrogen station calculates the value of the pressure loss coefficient k by substituting the value of the station pressure, mass flowrate, and the like acquired herein for the estimation formula (3) above.

It should be noted that, by the hydrogen gas filling method of the present Modification 3, since the pressure loss is estimated in stopping the supply of hydrogen gas for performing the first-time leak check, the timing for stopping the supply of hydrogen gas cannot be determined by estimating the increase pressure δP by using the estimation result. However, the estimation accuracy can be further improved by calculating again the value of the pressure loss coefficient by calculating the average value of the result acquired at the time of supply start of hydrogen gas and the result acquired at the time of supply stop of hydrogen gas, for example. It should be noted that, in restarting the filling of hydrogen gas after the first-time leak check is finished, the determination accuracy of the tank pressure in completing the filling can be improved by using the value of the pressure loss coefficient calculated again in this way.

<Modification 4>

In the hydrogen gas filling method of the first embodiment above, as explained referencing FIGS. 2 and 3, the volume of the hydrogen tank is estimated by performing processing of S2 to S7 irrespective of the type of the hydrogen tank connected to the hydrogen station. In that time, in order to estimate the volume of the hydrogen tank accurately, it is important to fill as great an amount as possible of hydrogen gas so that the pressure hysteresis error becomes as small as possible. In the first embodiment above, considering the above such points, the volume of the hydrogen tank is estimated after hydrogen gas is filled until the tank pressure reaches the target pressure (ΔPmax+Pi) determined by the upper limit pressure (ΔPmax). For this reason, in the hydrogen gas filling method of the first embodiment, some certain amount of hydrogen gas is experimentally filled irrespectively of the type of the hydrogen tank connected to the hydrogen station. However, when the volume of the hydrogen tank is too small, if hydrogen gas is filled, the tank pressure and the temperature rises suddenly, performing processing of S2 to S8 may not be appropriate.

Therefore, assuming that the volume of the hydrogen tank may be too small, it is considered that the volume of the tank is estimated before the tank pressure reaches the target pressure (ΔPmax+Pi) and the mass flowrate of hydrogen gas is inhibited until the accurate volume is determined in S7. However, since the error becomes large in the former case, the estimation accuracy of the volume of the hydrogen tank decreases. In addition, time required for filling becomes longer in the latter case. Therefore, it is reasonable that, before processing S2 to S8 is performed, the volume is roughly estimated, and when the connected hydrogen tank is determined to be the small tank that is too small, processing S2 to S7 is not performed for such small tank. Herein, the small tank is assumed specifically to be a hydrogen tank equipped in a two-wheeled fuel cell vehicle, for example.

Figure 8:
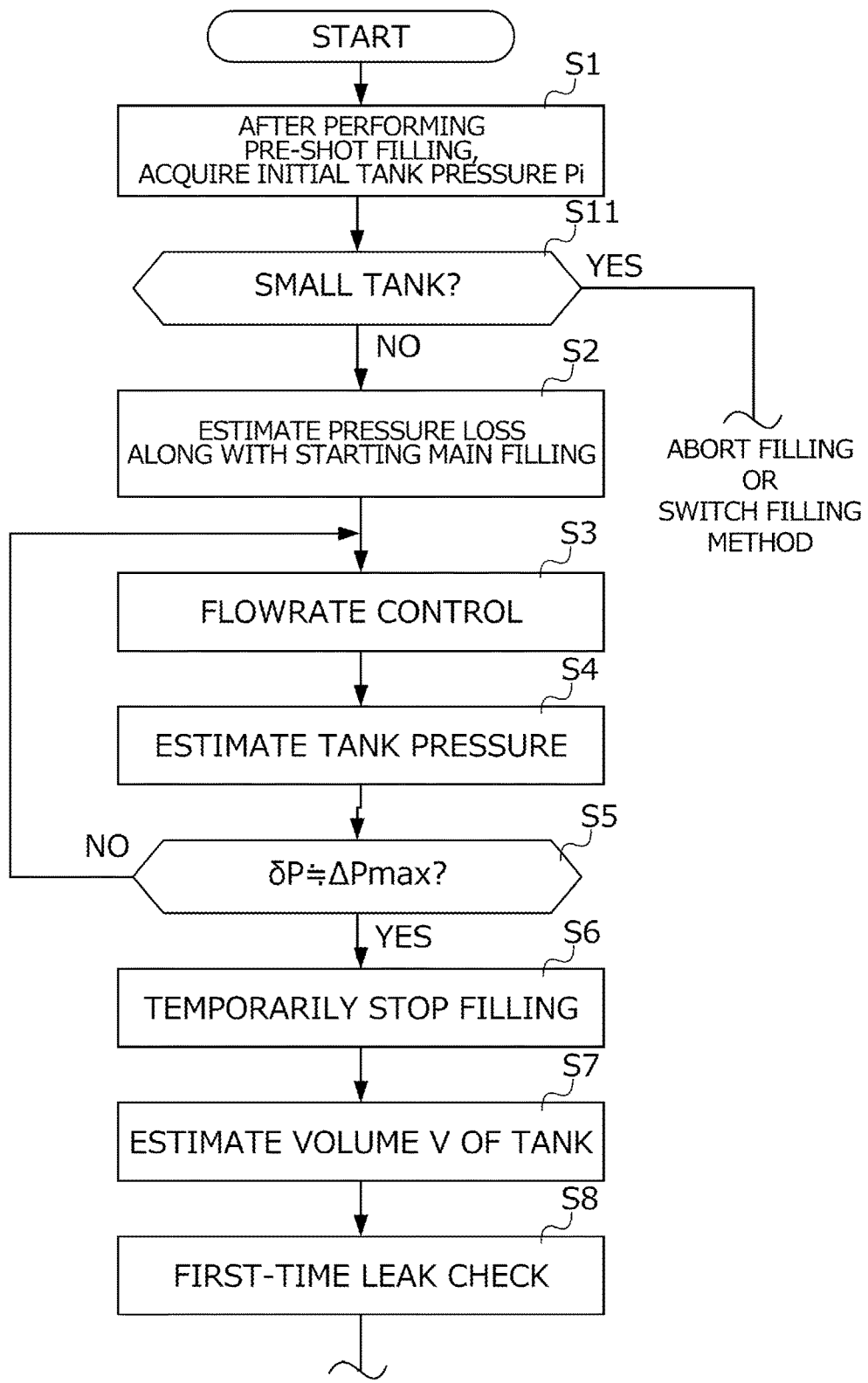
FIG. 8 is a flowchart showing a specific sequence of the hydrogen gas filling method (Modification 4)
Figure 9:
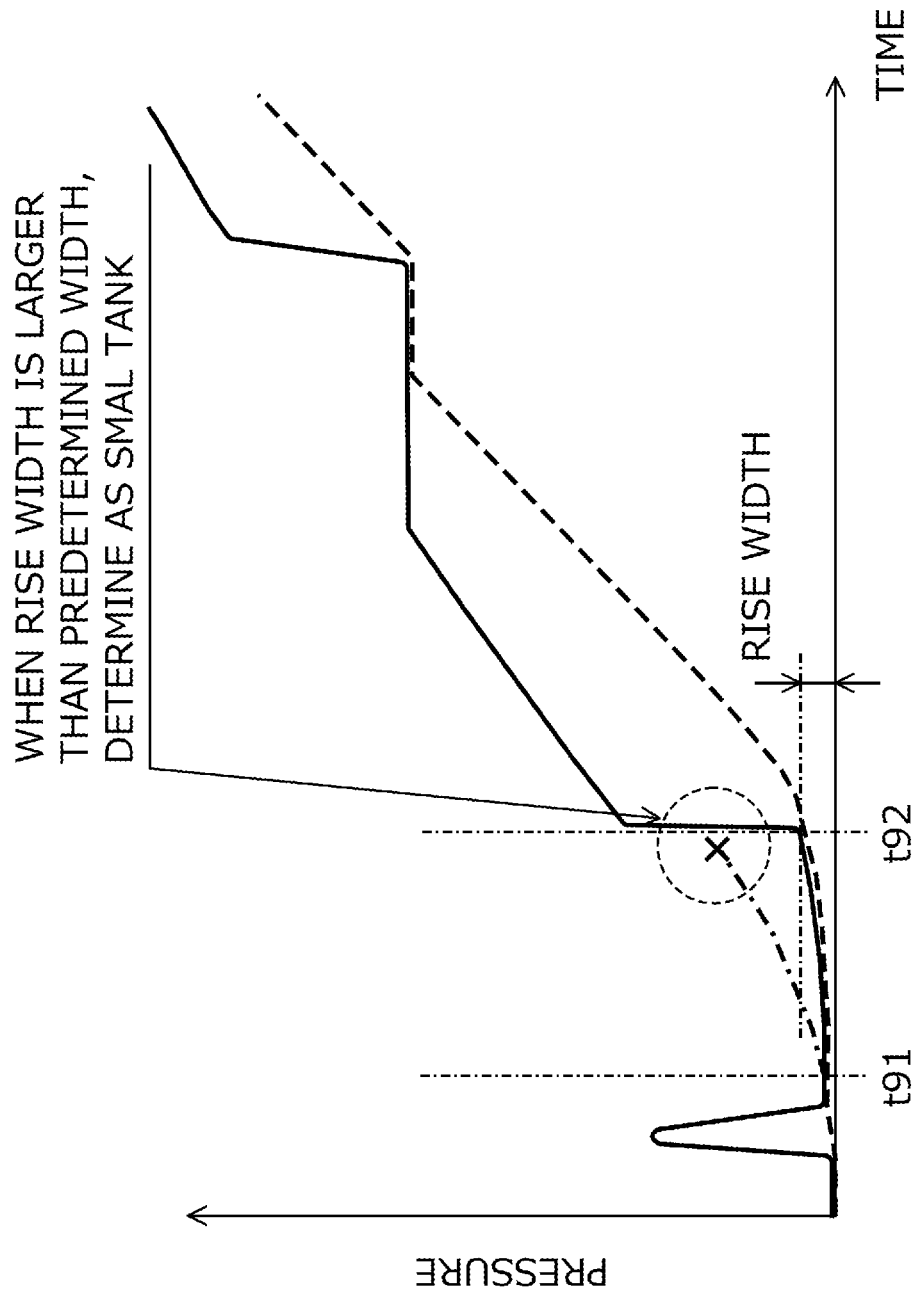
FIG. 9 is a time chart showing the variation with time of the station pressure and the tank pressure in the case of filling hydrogen gas by the flowchart of FIG. 8 (Modification 4)

FIG. 8 is a flowchart of the hydrogen gas filling method of the first embodiment added with a step for excluding the small tank (S1). FIG. 9 is a time chart showing the variation with time of the station pressure and the tank pressure in the case of filling hydrogen gas by the flowchart of FIG. 8. The hydrogen gas filling method of FIG. 8 will be explained in detail hereinafter while referencing the time chart of FIG. 9 as appropriate.

After the pre-shot filling of S1 is finished, the hydrogen station determines whether or not the hydrogen tank currently connected is the small tank having a predetermined volume or less (refer to S11). In the case of the determination of S11 being YES, i.e., the hydrogen tank is determined to be the small tank, the filling of hydrogen gas is aborted by not performing processing of S2 to S8 or filling of hydrogen gas is continued by switching to another filling method suitable for the small tank. In the case of the determination of S11 being NO, i.e., the hydrogen tank is determined to be not the small tank, processing of S2 to S8 is performed.

Herein, the method of determining whether or not it is the small tank in S11 is explained. First, using the volume transmitted value $V_{IR}$ transmitted from the vehicle and received in the hydrogen station is considered. In this case, the hydrogen station determines that the hydrogen tank is the small tank when the volume transmitted value $V_{IR}$ is a predetermined threshold or less, and determines that the hydrogen tank is not the small tank when the volume transmitted value $V_{IR}$ is larger than the threshold value.

Second, using the rise width of the station pressure at the time of supply of hydrogen gas for a predetermined time is considered. In this case, the hydrogen station acquires the rise width of the station pressure at the time when filling is performed in the constant mass or constant mass flow rate over a predetermined time (time t91 to t92), and determines that the hydrogen tank is the small tank when the rise width is a predetermined width or less and determines that the hydrogen tank is not the small tank when the rise width is larger than a predetermined width.

<Modification 5>

In the Modification 4 above, whether or not it is the small tank is determined before the main filling is started and the pressure loss is estimated, but in this case, it takes certain time as shown in time t91 to 92 in FIG. 9. On the other hand, in the hydrogen gas filling method of the first embodiment, after the main filling is started, the pressure loss is acquired immediately, as shown in FIG. 4. In addition, by using the pressure loss as described later, whether or not currently connected tank is the small tank can be roughly determined even though the accurate volume is unknown. Therefore, if whether or not it is the small tank is determined by using the pressure loss, waiting time shown in time t91 to 92 of FIG. 9 is not required.

Figure 10:
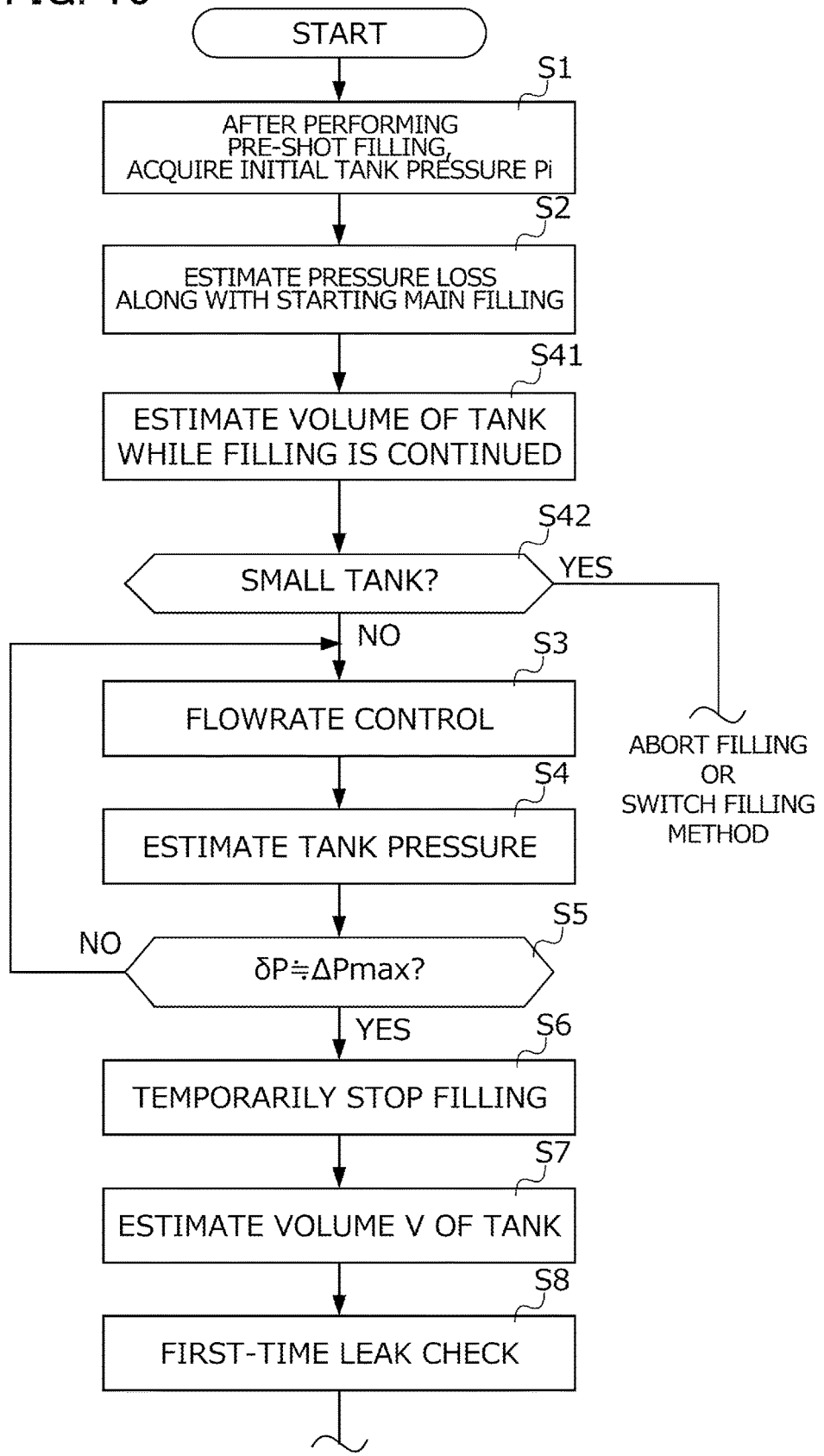
FIG. 10 is a flowchart showing a specific sequence of the hydrogen gas filling method (Modification 5)

FIG. 10 is a flowchart of a hydrogen gas filling method of the first embodiment added with a step for excluding the small tank (refer to S41).

In S2, after the value of the pressure loss coefficient k is calculated along with starting the main filling, the hydrogen station estimates the volume of the currently connected hydrogen tank while continuing filling by using the pressure loss coefficient k acquired in S2 and the estimation formula of the formulae (5-1) and (5-2) above (refer to S41). Herein, the specific value of the hydrogen amount Σm in the formula (5-1) is calculated by integrating the output of the mass flow meter during a time since the main filling is started until the current time point. In addition, the specific value of the hydrogen gas density variation amount dσ in the formulae (5-1) and (5-2) is calculated by subtracting the hydrogen gas density (σ(Pi,Ti)) at the time of the start of the main filling from the hydrogen gas density (σ(Pe,Te)) in the hydrogen tank at current time point in which filling is continuing. The hydrogen gas density in each time can be calculated by searching a map on the basis of the tank pressure and the tank temperature, similarly to the processing of S7. In that time, as the tank pressure and the tank temperature at current time in which filling is continuing, the tank pressure estimated by the formula (4) by using the pressure loss coefficient k acquired in S2 and the temperature transmitted value transmitted from the vehicle at current point are used respectively.

In S42, whether or not the currently connected hydrogen tank is the small tank is determined by using the volume estimated in S41. In the case of the determination of S42 being YES, i.e., the hydrogen tank is determined to be the small tank, the filling of hydrogen gas is aborted by not performing processing of S3 to S8 or filling of hydrogen gas is continued by switching to another filling method suitable for the small tank. In the case of the determination of S42 being NO, i.e., the hydrogen tank is determined to be not the small tank, processing of S3 to S8 is performed. It should be noted that, in S41, although the estimation accuracy becomes lower compared with the processing of S7 since the volume is estimated while filling is continued in a state where the pressure in the tank is low, it is enough to determine roughly whether or not the currently connected tank is the small tank.

<Second Embodiment>

Figure 11:
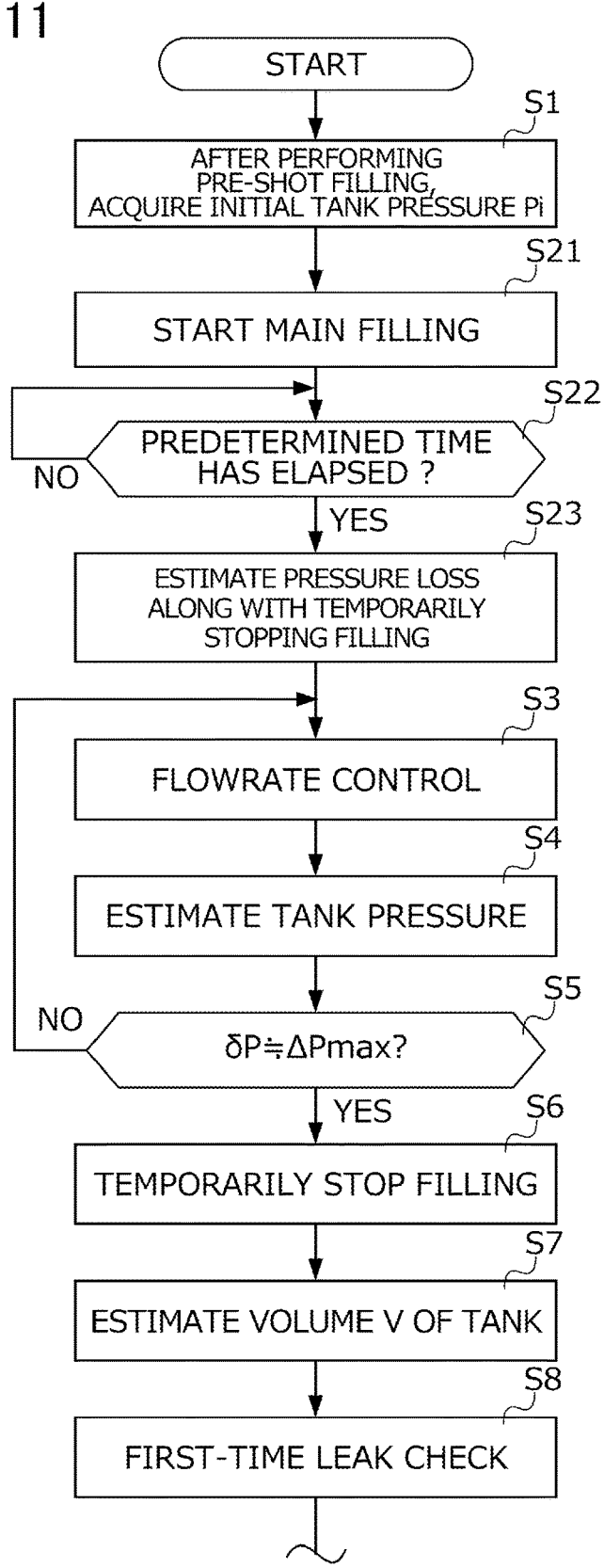
FIG. 11 is a flowchart showing a specific sequence of the hydrogen gas filling method according to a second embodiment of the present invention.
Figure 12:
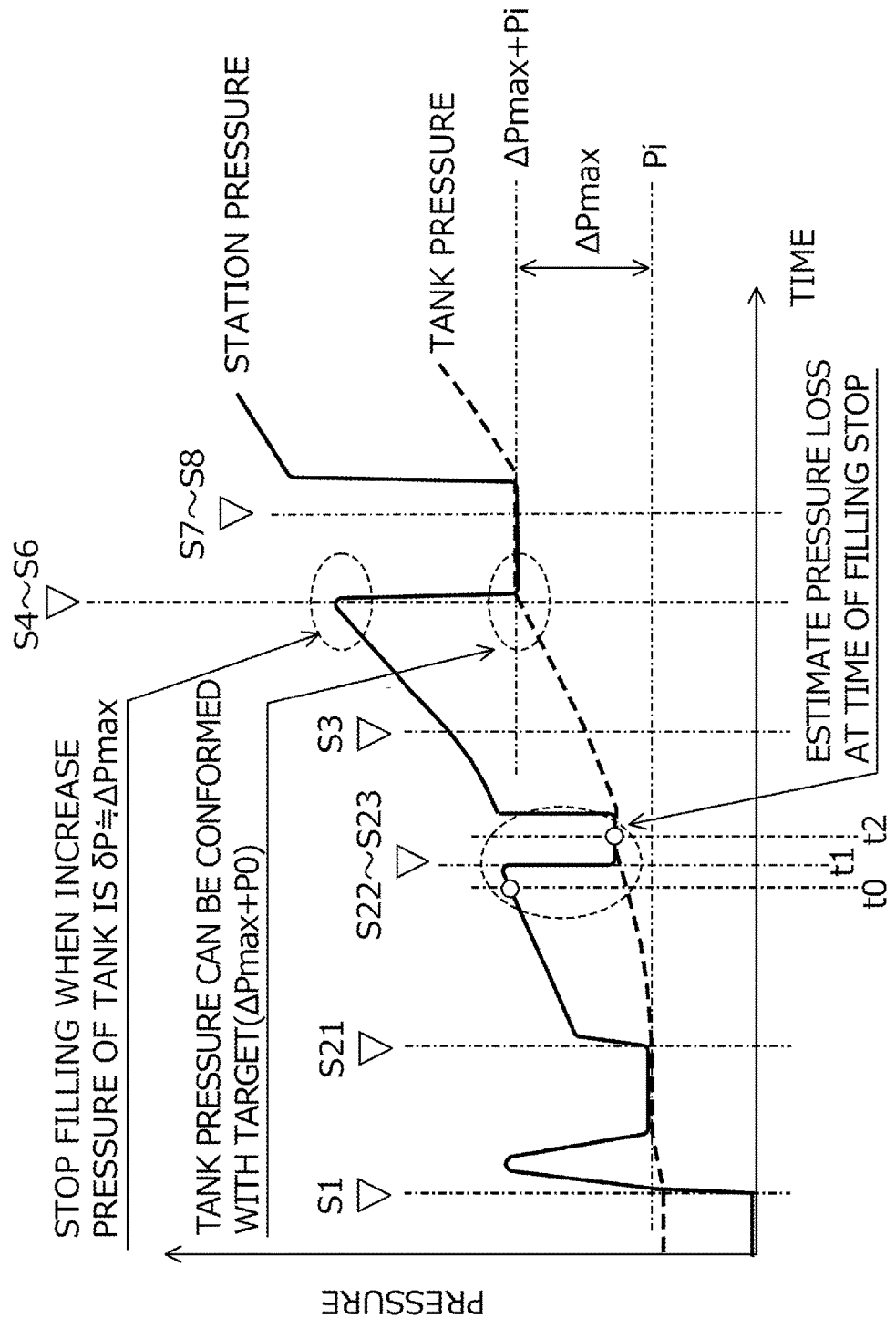
FIG. 12 is a time chart showing the variation with time of the station pressure and the tank pressure in the case of filling hydrogen gas by the flowchart of FIG. 11.

A second embodiment of the present invention will be explained hereinafter while referencing the drawings. FIG. 11 is a flowchart showing a specific sequence of the hydrogen gas filling method according to the present embodiment. FIG. 12 is a time chart showing the variation with time of the station pressure and the tank pressure in the case of filling hydrogen gas by the flowchart of FIG. 11. The hydrogen gas filling method of the present embodiment will be explained in detail hereinafter while referencing the time chart of FIG. 12 as appropriate. In addition, in the flowchart of FIG. 11, same reference numerals are imparted to the same processing as that of FIG. 2 and detailed explanation thereof will be omitted.

First, in the hydrogen gas filling method of the first embodiment above, as explained referencing FIG. 4, the pressure loss is estimated by utilizing that the station pressure increases in a step-like manner in starting of the main filling (refer to S2 of FIG. 2), the increase pressure δP of the hydrogen tank is estimated by using the estimation result (refer to S5 of FIG. 2), and filling of hydrogen gas is stopped at a timing specified from the estimation result (refer to S6 of FIG. 2). The hydrogen gas filling method of the present embodiment has different timing for estimating the pressure loss from that of the hydrogen gas filling method of the first embodiment. More specifically, as shown in FIG. 12, difference from the hydrogen gas filling method of the first embodiment is that a step is included for temporarily stopping filling of hydrogen gas to estimate the pressure loss during the time since the main filling is started until filling of hydrogen gas is stopped to perform the first-time leak check.

After the pre-shot filling is finished in S1, the hydrogen station opens the flow control valve and starts the main filling in S21, and the processing advances to S22. In S22, the hydrogen station determines whether or not a predetermined time has elapsed since the main filling is started. Herein, when a predetermined time has elapsed, the hydrogen station temporarily stops the supply of hydrogen gas in the same sequence as the Modification 3, and calculates the value of the pressure loss coefficient k by using the station pressure Pstation and the mass flowrate dm acquired before and after the supply stop of hydrogen gas (refer to S23).

More specifically, in S23, the hydrogen station first acquires the value of the station pressure Pstation at time t0 that is the immediately before the supply stop of hydrogen gas and the hydrogen gas temperature Tgas and the mass flowrate dm at the same time t0. Next, at time t1, the hydrogen station closes the flow control valves and stops the supply of hydrogen gas. Next, the hydrogen station acquires the value of the station pressure Pstation at time t2 that is immediately after the supply stop of hydrogen gas (noted as "P0" in the present embodiment). Next, the hydrogen station substitutes the value of the station pressure, mass flowrate, and the like acquired herein for the estimation formula (3) above to calculate the value of the pressure loss coefficient k. After calculating the value of the pressure loss coefficient k by the sequence above, the hydrogen station estimates the volume V of the hydrogen tank by performing the same processing S3 to S8 as FIG. 2.

According to the hydrogen gas filling method of the present embodiment, since it is necessary to open and close the flow control valves too many compared with the hydrogen gas filling method of the first embodiment, it has a disadvantage that filling time gets longer for that, but other than this point, the tank pressure can be conformed with the target accurately similarly as the hydrogen gas filling method of the first embodiment. In addition, the hydrogen gas filling method of the present embodiment has an advantage if the pressure loss could not have been estimated at time point of supply starting of hydrogen gas as the hydrogen gas filling method of the first embodiment, for some reason.

Although a hydrogen gas filling method according to a second embodiment of the present invention has been explained above, the present invention is not to be limited thereto. The configurations of the detailed parts may be modified as appropriate within the scope of the gist of the present invention.

<Third Embodiment>

Figure 13:
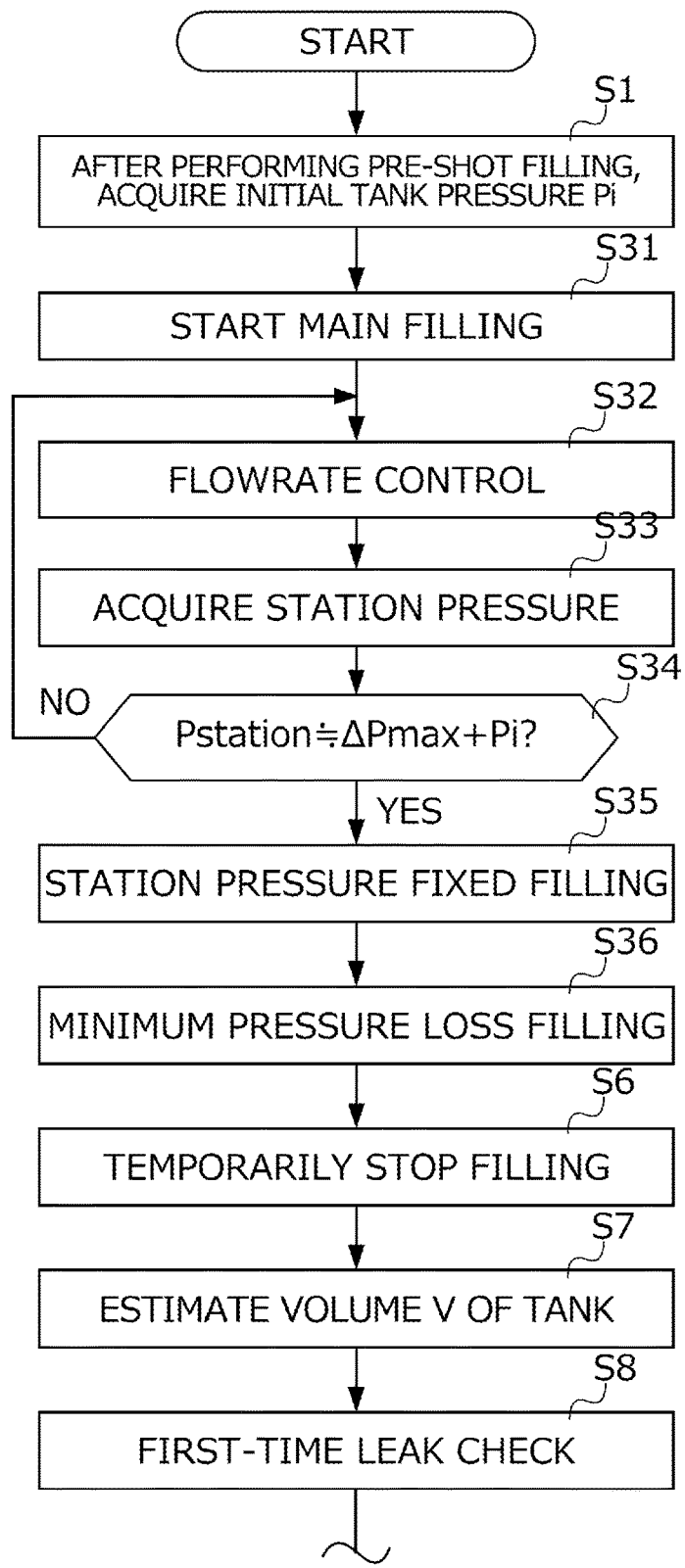
FIG. 13 is a flowchart showing a specific sequence of the hydrogen gas filling method according to a third embodiment of the present invention.
Figure 14:
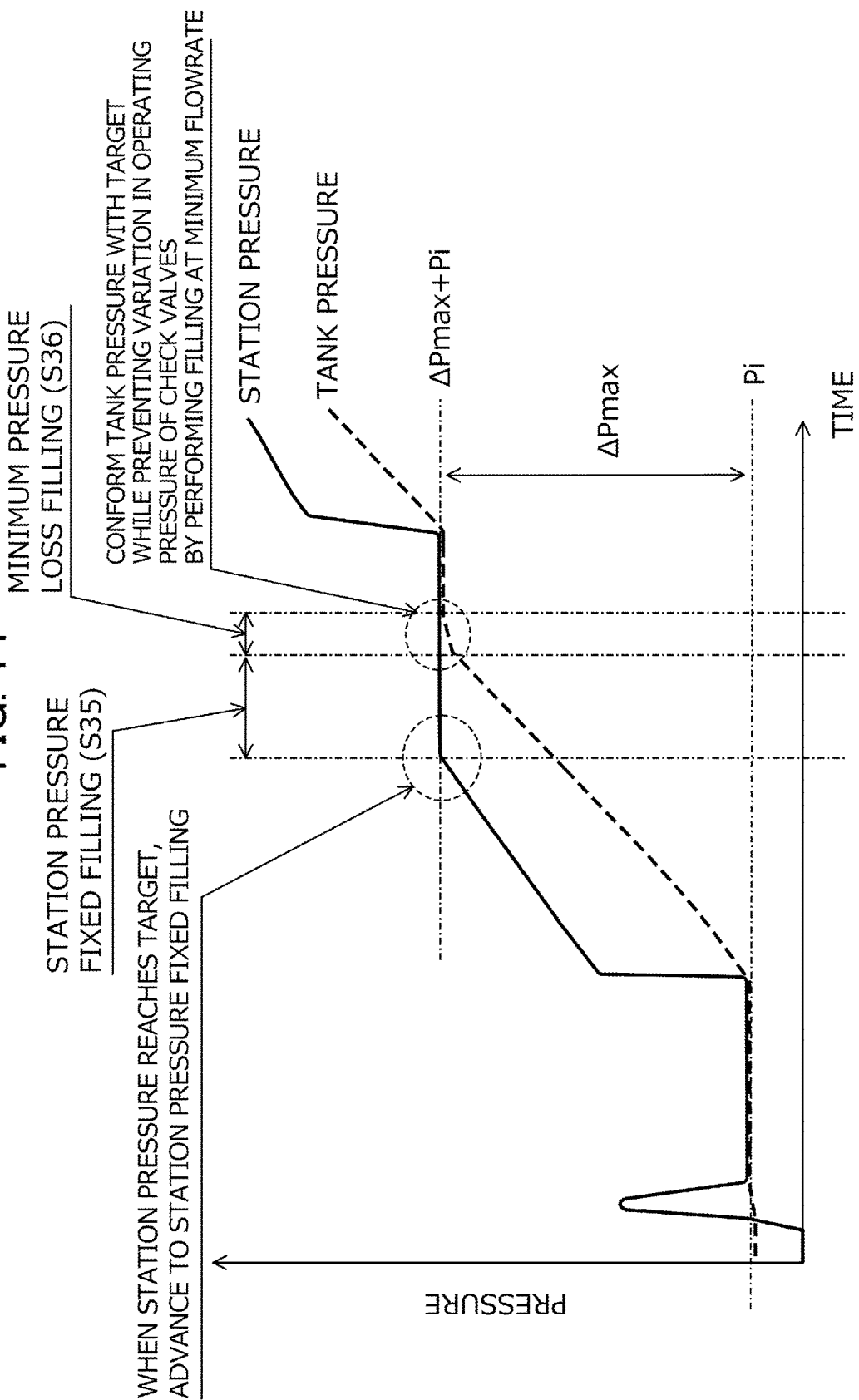
FIG. 14 is a time chart showing the variation with time of the station pressure and the tank pressure in the case of filling hydrogen gas by the flowchart of FIG. 13.

A third embodiment of the present invention will be explained hereinafter while referencing the drawings. FIG. 13 is a flowchart showing a specific sequence of the hydrogen gas filling method according to the present embodiment. FIG. 14 is a time chart showing the variation with time of the station pressure and the tank pressure in the case of filling hydrogen gas by the flowchart of FIG. 13. The hydrogen gas filling method of the present embodiment will be explained in detail hereinafter while referencing the time chart of FIG. 14 as appropriate. In addition, in the flowchart of FIG. 13, same reference numerals are imparted to the same processing as that of FIG. 2 and detailed explanation thereof will be omitted.

First, in the hydrogen gas filling method of the first and second embodiments above, the pressure loss is estimated by utilizing that the station pressure changes in a step-like manner in starting and stopping of filling, and the supply of hydrogen gas is stopped at an appropriate timing so that the tank pressure conforms with a predetermined target pressure by using the estimation result. The hydrogen gas filling method of the present embodiment is different from the hydrogen gas filling methods of the first and second embodiments in the feature that the supply of hydrogen gas is stopped at an appropriate timing so that the tank pressure conforms with the target pressure without estimating the pressure loss.

After the pre-shot filling is finished in S1, the hydrogen station opens the flow control valve and starts the main filling in S31, and the processing advances to S32. In S32, the hydrogen station controls the flowrate of hydrogen gas so that the station pressure rises with a predetermined gradient as shown in FIG. 14. Then, the hydrogen station acquires the value of the current station pressure Pstation (refer to S33) and determines whether or not the value reaches the vicinity of the target pressure ($\Delta Pmax+Pi$) set to the tank pressure. In the case of the determination of S34 being NO, the hydrogen station returns to S32 to continue filling, and in the case of the determination of S34 being YES, and the processing advances to S35.

In S35, the hydrogen station performs the station pressure fixed filling in which hydrogen gas filling is continued while the station pressure Pstation is maintained to be the target pressure ($\Delta Pmax+Pi$), for a predetermined time. By continuing such station pressure fixed filling, the tank pressure Ptank rises and approaches to the target pressure ($\Delta Pmax+Pi$) asymptotically while the station pressure Pstation is maintained to be the target pressure ($\Delta Pmax+Pi$). In addition, as the tank pressure approaches to the target pressure, the flowrate of hydrogen gas asymptotically approaches to 0. Therefore, in S35, in response to that a predetermined time has elapsed from the station pressure fixed filling is started, more specifically, time that can be determined that the tank pressure approaches to the target pressure to some extent, the hydrogen station ends the station pressure fixed filling and the processing advances to next, S36.

In S36, the hydrogen station performs the minimum pressure loss filling in which hydrogen gas filling is continued while the mass flowrate is maintained to be the minimum flowrate, for a predetermined time. After that, the hydrogen station temporarily stops the filling of hydrogen gas (refer to S6), estimates the volume V of the tank (refer to S7), and performs the first-time leak check (refer to S8), similarly to the flowchart of FIG. 2. Herein, the minimum flowrate in S36 is specifically, an extent in which check valves provided in the piping that connects the hydrogen station and the hydrogen tank, are maintained to open, and an extent in which constant flow (substantially constant flowrate) can be kept in a device used in the hydrogen station. In S35, after the station pressure fixed filling is performed for a predetermined time and the tank pressure approaches to the target pressure to some extent, by performing such minimum pressure loss filling, the variation in the operating pressure of the check valves can be prevented and the tank pressure can be conformed with the target pressure with higher accuracy. In addition, if performing the station pressure fixed filling of S35, since the flowrate of hydrogen gas approaches to 0 asymptotically, much time is required for converging the tank pressure to the target pressure. In the present embodiment, by performing the station pressure fixed filling for a predetermined time and switching to the minimum pressure loss filling before the tank pressure converges to the target pressure, time required for filling can be reduced while the tank pressure is approached to the target pressure.

Although a hydrogen gas filling method according to the third embodiment of the present invention has been explained above, the present invention is not to be limited thereto. The configurations of the detailed parts may be modified as appropriate within the scope of the gist of the present invention.

What is claimed is:

1. A gas filling method for connecting a tank that stores gas and a supply source that supplies gas by a piping, and filling gas in the tank, the method comprising:
   acquiring a pre-start upstream pressure that is a pressure in the supply source side of the piping before the start of the supply of gas;
   starting the supply of gas from the supply source after the pre-start upstream pressure is acquired;
   acquiring a post-start upstream pressure that is a pressure in the supply source side of the piping after the start of the supply of gas;
   acquiring a post-start flowrate that is a flowrate of gas in the same period as a period in which the post-start upstream pressure is acquired;
   estimating the pressure loss generated in the piping at the time of the supply of gas by using the pre-start upstream pressure, the post-start upstream pressure, and the post-start flowrate; and
   stopping the supply of gas so that a tank pressure that is the pressure in the tank becomes a predetermined target pressure by using the pressure loss,
   wherein the post-start upstream pressure is acquired in two or more different acquisition periods defined between a time when the flowrate of gas is 0 and a time when the flowrate of the gas reaches a predetermined target flowrate, and
   the post-start flowrate is acquired in the same period as each of the acquisition periods, and the pressure loss generated in the piping at the time of the supply of gas in the piping is estimated by using the pre-start upstream pressure, and the post-start upstream pressure and the post-start flowrate acquired in each of the acquisition periods.

2. The gas filling method according to claim 1, further comprising:
   estimating a tank pressure that is a pressure in the tank during the supply of gas by using the pressure loss; and
   estimating a volume of the tank after the supply of the gas is stopped.

3. The gas filling method according to claim 2, wherein stopping the supply of gas is performed after the gas has been continuously supplied for a predetermined time while the upstream pressure is maintained to be the target pressure.

4. The gas filling method according to claim 2, wherein stopping the supply of gas is performed so that the estimated tank pressure reaches the target pressure.

5. The gas filling method according to claim 4, further comprising:
   a pre-stop upstream pressure acquisition step for acquiring a pre-stop upstream pressure that is a pressure in the supply source side of the piping before the supply of gas is stopped;
   a post-stop upstream pressure acquisition step for acquiring a post-stop upstream pressure that is a pressure in the supply source side of the piping after the supply of gas is stopped;
   a pre-stop flowrate acquisition step for acquiring a pre-stop flowrate that is a flowrate of gas at the same period as the acquisition period of the pre-stop upstream pressure; and
   a stop-time pressure loss estimation step for estimating the pressure loss generated in the piping at the time of the supply of gas by using the pre-stop upstream pressure, the post-stop upstream pressure, and the pre-stop flowrate.

6. The gas filling method according to claim 2, further comprising:
   receiving volume information of the tank from a vehicle equipped with the tank,
   wherein the flowrate of gas is controlled by using the volume information received from the vehicle between starting of the supply of gas and temporarily stopping the supply of gas, and
   wherein the flowrate of gas is controlled by using the estimated volume information after the supply of gas is started again after the supply of gas is temporarily stopped. estimated by using the pre-start upstream pressure, and the post-start upstream pressure and the post-start flowrate acquired in each of the acquisition periods.

7. A gas filling method for connecting a tank that stores gas and a supply source that supplies gas by a piping, and filling gas in the tank, the method comprising:
   starting the supply of gas from the supply source;
   acquiring a pre-stop upstream pressure that is a pressure in the supply source side of the piping before the stop of the supply of gas;
   acquiring a pre-stop flowrate that is a flowrate of gas in the same period as a period in which the pre-stop upstream pressure is acquired;
   temporarily stopping the supply of gas from the supply source after the pre-stop upstream pressure is acquired;
   acquiring a post-stop upstream pressure that is a pressure in the supply source side of the piping after the supply of gas is temporarily stopped;
   estimating the pressure loss generated in the piping at the time of the supply of gas by using the pre-stop upstream pressure, the post-stop upstream pressure, and the pre-stop flowrate; and
   stopping the supply of gas so that a tank pressure that is a pressure in the tank becomes a predetermined target pressure by using the pressure loss,
   wherein the post-start upstream pressure is acquired in two or more different acquisition periods defined between a time when the flowrate of gas is 0 and a time when the flowrate of the gas reaches a predetermined target flowrate, and
   the post-start flowrate is acquired in the same period as each of the acquisition periods, and the pressure loss generated in the piping at the time of the supply of gas in the piping is estimated by using the pre-start upstream pressure, and the post-start upstream pressure and the post-start flowrate acquired in each of the acquisition periods.

* * * * *